United States Patent
Yamamoto et al.

(10) Patent No.: US 10,350,680 B2
(45) Date of Patent: Jul. 16, 2019

(54) METAL POWDER COMPOSED OF SPHERICAL PARTICLES

(71) Applicant: Sanyo Special Steel Co., Ltd., Himeji-shi (JP)

(72) Inventors: Takahisa Yamamoto, Himeji (JP); Tetsuro Kariya, Himeji (JP)

(73) Assignee: Sanyo Specia Steel Co., Ltd., Hyogo (JP)

( * ) Notice: Subject to any disclaimer, the term of this patent is extended or adjusted under 35 U.S.C. 154(b) by 0 days.

(21) Appl. No.: 15/562,600

(22) PCT Filed: Mar. 24, 2016

(86) PCT No.: PCT/JP2016/059444
§ 371 (c)(1),
(2) Date: Sep. 28, 2017

(87) PCT Pub. No.: WO2016/158687
PCT Pub. Date: Oct. 6, 2016

(65) Prior Publication Data
US 2018/0104740 A1    Apr. 19, 2018

(30) Foreign Application Priority Data

Mar. 31, 2015   (JP) .................................. 2015-071902
Feb. 4, 2016    (JP) .................................. 2016-019607

(51) Int. Cl.
| | |
|---|---|
| *B22F 1/00* | (2006.01) |
| *C22C 38/48* | (2006.01) |
| *C22C 38/46* | (2006.01) |
| *C22C 38/16* | (2006.01) |
| *C22C 38/14* | (2006.01) |
| *C22C 38/12* | (2006.01) |
| *C22C 38/10* | (2006.01) |
| *C22C 38/06* | (2006.01) |
| *C22C 38/02* | (2006.01) |
| *C22C 19/07* | (2006.01) |
| *C22C 19/05* | (2006.01) |
| *C22C 30/02* | (2006.01) |
| *C22C 38/00* | (2006.01) |
| *C22C 19/03* | (2006.01) |
| *B33Y 70/00* | (2015.01) |
| *B22F 3/105* | (2006.01) |
| *B22F 9/08* | (2006.01) |
| *B22F 9/18* | (2006.01) |
| *C22C 1/04* | (2006.01) |
| *C22C 33/02* | (2006.01) |

(52) U.S. Cl.
CPC .......... *B22F 1/0048* (2013.01); *B22F 1/0011* (2013.01); *B33Y 70/00* (2014.12); *C22C 19/03* (2013.01); *C22C 19/05* (2013.01); *C22C 19/056* (2013.01); *C22C 19/07* (2013.01); *C22C 30/02* (2013.01); *C22C 38/00* (2013.01); *C22C 38/007* (2013.01); *C22C 38/008* (2013.01); *C22C 38/02* (2013.01); *C22C 38/06* (2013.01); *C22C 38/105* (2013.01); *C22C 38/12* (2013.01); *C22C 38/14* (2013.01); *C22C 38/16* (2013.01); *C22C 38/46* (2013.01); *C22C 38/48* (2013.01); *B22F 3/1055* (2013.01); *B22F 9/082* (2013.01); *B22F 9/18* (2013.01); *B22F 2301/15* (2013.01); *B22F 2301/35* (2013.01); *B22F 2998/10* (2013.01); *B22F 2999/00* (2013.01); *C22C 1/0433* (2013.01); *C22C 33/02* (2013.01); *Y02P 10/295* (2015.11)

(58) Field of Classification Search
None
See application file for complete search history.

(56) References Cited

FOREIGN PATENT DOCUMENTS

| | | | |
|---|---|---|---|
| JP | 6233090 | A | 2/1987 |
| JP | 5279701 | A | 10/1993 |
| JP | 2001152204 | A | 6/2001 |
| JP | 2001192703 | A | 7/2001 |
| JP | 2005281761 | A | 10/2005 |
| JP | 2006321711 | A | 11/2006 |
| JP | 201121218 | A | 2/2011 |
| WO | WO-2015012055 | A1 * | 1/2015 ............... C22C 9/02 |

OTHER PUBLICATIONS

Machine translation JP-5279701 (Year: 1993).*
Machine translation JP2006-321711 (Year: 2006).*
Machine translation WO 2015/012055 (Year: 2015).*

* cited by examiner

*Primary Examiner* — Alexandre F Ferre
(74) *Attorney, Agent, or Firm* — The Webb Law Firm

(57) ABSTRACT

A problem to be solved is to provide a metal powder having a variety of excellent performances, and, in order to solve such a problem, the present invention provides a metal powder that is composed of many spherical particles; that includes at least one of Ni, Fe, and Co, in which the total content (T.C.) of the Ni, the Fe, and the Co is 50 mass % or more; that has a cumulative 10 vol % particle size D10 of 1.0 μm or more; and in which a value Y is 7.5 to 24.0 as calculated by the following mathematical equation: $Y = D50 \times \rho \times S$, where D50 represents a cumulative 50 vol % particle size of the powder, $\rho$ represents a true density of the powder, and S represents a specific surface area of the powder.

19 Claims, No Drawings

METAL POWDER COMPOSED OF SPHERICAL PARTICLES

CROSS-REFERENCE TO RELATED APPLICATIONS

This application is the United States national phase of International Application No. PCT/JP2016/059444 filed Mar. 24, 2016, and claims priority to Japanese Patent Application Nos. 2015-071902 and 2016-019607, filed Mar. 31, 2015 and Feb. 4, 2016, respectively, the disclosures of which are hereby incorporated in their entirety by reference.

BACKGROUND OF THE INVENTION

Field of the Invention

The present invention relates to a metal powder used for three-dimensional additive manufacturing processes, thermal spraying processes, laser coating processes, padding processes, and the like. More specifically, the present invention relates to a metal powder including many spherical particles.

Background Art

Three-D printers are used for the fabrication of shaped objects composed of metal. Such 3D printers involve a three-dimensional additive manufacturing process to fabricate shaped objects. In additive manufacturing processes, spread metal powder is irradiated with a laser beam or an electron beam. The irradiation melts the metal. Then, the metal solidifies. The melting and the solidifying allow the spherical particles in the powder to be bound together. The irradiation is conducted selectively against parts of the metal powder. The parts of the powder that are not irradiated are not melted. Only the parts that have been irradiated form a bound layer. A bound layer may also be obtained by the beam irradiation of metal powder that is spouted from a nozzle and is traveling.

A further metal powder is spread over the bound layer. This metal powder is irradiated with a laser beam or an electron beam. The irradiation melts the metal. Then, the metal solidifies. The melting and the solidifying allow the particles in the powder to be bound together and form a new bound layer. The new bound layer is bound to the existing bound layer.

Repeating the binding by irradiation grows an aggregate of bound layers gradually. This growth enables a shaped object having a three-dimensional shape to be obtained. The additive manufacturing process enables a shaped object having a complicated shape to be easily obtained.

A thermal spraying process is used for the formation of a metal coating layer. In thermal spraying processes, powder particles are accelerated. The acceleration is carried out using compressed gas and the like. The particles that are accelerated and are traveling are heated by a heating means. Examples of heating means include gas combustion flame, plasma, laser, and the like. The heating turns the particles into the molten state or the semi-molten state. These particles are collided against an object and solidified. By the solidifying, the particles are bound together. The particles are also bound to a base material. By the binding, a coating layer is formed. The metal powder may be heated after it is collided against an object. The metal powder may be heated while in contact with an object. A thermal spraying process by which a thick coating layer is formed is also referred to as a padding process. A thermal spraying process by which particles are heated with laser is also referred to as a laser coating process and in addition as a laser thermal spraying process.

Metal powder used for additive manufacturing processes, thermal spraying processes, padding processes, laser coating processes, and the like is produced by a water atomization process, a gas atomization process, and the like. The properties of this metal powder have an impact on the handling properties. The properties of the metal powder further have an impact on the properties of a three-dimensional shaped object or a coating layer.

Japanese Patent Laid-Open Publication No. 2001-152204 (PTL 1) has disclosed a metal product that is a shaped object obtained by an additive manufacturing process and that is impregnated with a metal having a melting point lower than that of the shaped object. The impregnation increases the density of the metal product.

Japanese Patent Laid-Open Publication No. 2006-321711 (PTL 2) has disclosed a metal powder having an arithmetic mean circularity of 0.7 or more. The surfaces of the particles of this powder are covered with aggregation prevention particles. This powder is less likely to cause aggregation. This powder has excellent handling properties. A shaped object obtained from this powder has a high density. This shaped object has excellent strength.

Japanese Patent Laid-Open Publication No. 2011-21218 (PTL 3) has disclosed a powder including a laser absorbent. A shaped object obtained from this powder has excellent strength.

CITATION LIST

Patent Literature

[PTL 1] Japanese Patent Laid-Open Publication No. 2001-152204

[PTL 2] Japanese Patent Laid-Open Publication No. 2006-321711

[PTL 3] Japanese Patent Laid-Open Publication No. 2011-021218

SUMMARY OF THE INVENTION

Technical Problem

An increasingly higher performance is demanded by powders used for additive manufacturing processes, thermal spraying processes, padding processes, laser coating processes, and the like.

An object of the present invention is to provide a powder having a variety of excellent performances.

Solution to Problem

The metal powder according to the present invention is composed of many spherical particles. This powder includes at least one of Ni, Fe, and Co. The total content (T.C.) of the Ni, the Fe, and the Co is 50 mass % or more. The metal powder has a cumulative 10 vol % particle size D10 of 1.0 µm or more. The powder has a value Y of 7.5 to 24.0 as calculated by the following mathematical equation:

$$Y = D50 \times \rho \times S$$

wherein D50 represents a cumulative 50 vol % particle size of the powder, $\rho$ represents a true density of the powder, and S represents a specific surface area of the powder.

In a preferred aspect of the metal powder according to the present invention, the balance other than the three kinds that are Ni, Fe, and Co includes: at least one of C, Si, Cr, Mo, Al, Ti, V, W, Nb, Zn, Ta, B, Ag, Cu, and Sn; and an unavoidable impurity.

In a preferred aspect of the metal powder according to the present invention, a ratio of a cumulative 60 vol % particle size D60 to a particle size D10 (D60/D10) is 1.0 or more and less than 10.0.

In a preferred aspect of the metal powder according to the present invention, a ratio of a particle size D50 to a mode diameter Dm (D50/Dm) is 0.80 to 1.20.

In a preferred aspect of the metal powder according to the present invention, a ratio P2 of the number of particles having a circularity of 0.95 or more to the total number of the particles is 50% or more. This ratio P2 is more preferably 80% or more.

In a preferred aspect of the metal powder according to the present invention, the metal powder has an oxygen concentration of less than 1000 ppm.

Two or more of the above-described preferred aspects of the metal powder according to the present invention may be combined.

Advantageous Effects of Invention

The powder according to the present invention has a Y value of 7.5 to 24.0. This powder has excellent handling properties. A shaped object obtained from this powder has high strength. A coating layer obtained from this powder has excellent wear resistance.

DETAILED DESCRIPTION OF THE INVENTION

The metal powder according to the present invention is an aggregate of many particles. The shape of each particle is spherical. In the present invention, "spherical particles" encompass truly spherical particles and particles having a nearly spherical shape.

The particles included in the metal powder according to the present invention include at least one of Ni, Fe, and Co. The particles may include only one of Ni, Fe, and Co. The particles may include only Ni and Fe. The particles may include only Fe and Co. The particles may include only Co and Ni. The particles may include all of Ni, Fe, and Co.

Preferred examples of materials of the particles included in the metal powder according to the present invention include SUS316, SUS630, ALLOYC276, ALLOY718, ALLOY-No. 6, and ALLOY-No. 20.

In the metal powder according to the present invention, the total content (T.C.) of Ni, Fe, and Co is 50 mass % or more. Ni is suitable for applications that require high corrosion resistance, Fe is suitable for applications that require high strength, and Co is suitable for applications that require high corrosion resistance and a high wear resistance. For a plurality of applications of interest, the powder may include two or more of Ni, Fe, and Co. The total content (T.C.) is particularly preferably 70 mass % or more. The total content (T.C.) may be 100 mass %.

The particles included in the metal powder according to the present invention may include other elements. Examples of such other elements include:
(1) elements that can contribute to enhanced strength, such as C, Mg, Al, Ti, V, Mn, Zn, and B;
(2) elements that contribute to machinability, such as S, P, Bi, and Sb;
(3) elements that can contribute to wear resistance, such as C, Cr, W, Mo, N, and B;
(4) elements that can contribute to corrosion resistance, such as Cr, Ag, Cu, Zr, Nb, Mo, Ta, W, and Sn; and
(5) elements that can contribute to magnetic properties, such as Si, Ge, Hf, La, Ce, Nd, Pr, Gd, Tb, Dy, Yb, and Y.

The particles may include an unavoidable impurity.

Preferably, the balance other than the three kinds that are Ni, Fe, and Co includes: at least one of C, Si, Cr, Mo, Al, Ti, V, W, Nb, Zn, Ta, B, Ag, Cu, and Sn; and an unavoidable impurity.

In the present invention, a value Y is calculated by the following mathematical equation (1):

$$Y = D50 \times \rho \times S$$

wherein D50 represents a cumulative 50 vol % particle size (m) of the powder, $\rho$ represents a true density ($kg/m^3$) of the powder, and S represents a specific surface area ($m^2/kg$) of the powder. A value Y is 7.5 to 24.0.

The metal powder according to the present invention has a cumulative 10 vol % particle size D10 of 1.0 μm or more.

When the particles are truly spherical, the diameter $d_1$, surface area $S_1$, and density $\rho$ thereof satisfy the following mathematical equation:

$$d_1 = 6/(\rho \times S_1)$$

Particles having irregularities on the surface thereof have a larger surface area $S_1$, compared to truly spherical particles. Accordingly, a diameter d of a particle having irregularities on the surface thereof is smaller, compared to that of a truly spherical particle. When particles have a diameter $d_1$ that is small, this diameter $d_1$ is different from the apparent diameter. For a powder, which is an aggregate of particles, an average value per mass of surface areas of individual particles is expressed as a specific surface area S.

Accordingly, a value d calculated by the following mathematical equation represents an average value of the diameters of the powder.

$$d = 6/(\rho \times S)$$

A powder whose particles are all truly spherical has a particle size D50 that is equal to a diameter d. In another case in which particles have irregularities, the particle size D50 is larger than the diameter d. The present inventors have intensively studied and consequently found that a powder having a (d/D50) value of 0.25 to 0.8 has excellent fluidity. A powder having a (d/D50) value of 0.25 to 0.8 has a value Y of 7.5 to 24.0.

A powder having a value Y in the above-described range has particles whose surface irregularities are small. This powder has excellent fluidity. Thus, this powder has excellent handling properties. A shaped object obtained from this powder has high strength. A coating layer obtained from this powder has excellent wear resistance.

The true density $\rho$ of a powder refers to a density whose denominator is a volume that does not include surface pores nor inside voids and is only the volume occupied by the solid itself. The true density $\rho$ is derived by a gas displacement method. Examples of the measurement devices include a dry-type automated densimeter "AccuPyc 111340" available from Shimadzu Corporation.

The specific surface area S of a powder means a surface area per unit mass. The specific surface area S is derived by a gas adsorption method. Examples of the measurement devices include a flow-type automated specific surface area analyzer "FlowSorb 1112305" available from Shimadzu Corporation.

For the metal powder according to the present invention, a ratio of a cumulative 60 vol % particle size D60 to a particle size D10 (D60/D10) is preferably 1.0 or more and less than 10.0. When powder is packed, particles having a small diameter come between particles having a large diameter. A powder having an excessively large amount of particles having a small diameter has poorer fluidity. Such a powder has poorer spreading properties. A powder having an excessively small amount of particles having a small diameter has a large volume shrinkage factor during melting. The present inventors have intensively studied and consequently found that a powder having a ratio (D60/D10) of 1.0 or more and less than 10.0 has both spreading properties and a low shrinkage factor. The ratio (D60/D10) is preferably 2.0 or more, particularly preferably 5.0 or more. The ratio (D60/D10) is preferably 8.0 or less, particularly preferably 6.0 or less.

In the measurement of the particle sizes D10, D50, and D60 of a powder, a cumulative curve is determined, given that the whole volume of powder is 100%. The particle size for the point of a cumulative volume of 10% on this curve is D10. The particle size for the point of a cumulative volume of 50% on this curve is D50. The particle size for the point of a cumulative volume of 60% on this curve is D60. The particle sizes D10, D50, and D60 are measured by a laser diffraction scattering method. Examples of devices suitable for this measurement include a laser diffraction scattering particle size distribution analyzer "Microtrac MT3000" available from Nikkiso Co., Ltd. Powder together with pure water is poured into the cell of this analyzer, and particle sizes are detected on the basis of light scattering information of the particles.

For the metal powder according to the present invention, a ratio of a particle size D50 to a mode diameter Dm (D50/Dm) is preferably 0.80 to 1.20. The particle size distribution of powder having the ratio (D50/Dm) in this range is near a logarithmic normal distribution. This powder has excellent fluidity. Thus, this powder has excellent handling properties. A shaped object obtained from this powder has high strength. A coating layer obtained from this powder has excellent wear resistance. From these viewpoints, the ratio (D50/Dm) is more preferably 0.85 to 1.15, particularly preferably 0.90 to 1.10.

In the measurement of a mode diameter Dm, a frequency curve of a particle size distribution is determined on the basis of volume. A particle size whose frequency is the largest on this frequency curve is the mode diameter Dm. A frequency curve of a particle size distribution is determined by a laser diffraction scattering method. Examples of devices suitable for this measurement include a laser diffraction scattering particle size distribution analyzer "Microtrac MT3000" available from Nikkiso Co., Ltd.

For the metal powder according to the present invention, a ratio P2 to the total number of the particles of the number of particles having a circularity of 0.95 or more is preferably 50% or more. This powder has excellent fluidity and packing properties. When this powder is used for additive manufacturing processes or thermal spraying processes, it can be spread smoothly and densely. Further, a shaped object and a coating layer obtained from this powder have excellent strength. From these viewpoints, the ratio P2 is more preferably 70% or more, particularly preferably 80% or more. As a method for measuring a circularity, an image analysis device is used. A photograph of a powder is taken from above, and a circularity is calculated from the outline of the powder using an image analysis device. When the powder is spherical having a circular outline, the circularity is 1, and when the powder has irregularities, the circularity is a figure that is 0 or more but less than 1.

The circularity Ro is calculated by the following mathematical equation:

$$Ro = 4\pi S/L^2$$

In this mathematical equation, S is the projection area of particles or their cross-section, and L is the outline length of this projection image. For the measurement of the projection area S and the outline length L, for example, an image analysis device is used.

The metal powder according to the present invention preferably has an oxygen concentration of less than 1000 ppm. This oxygen concentration correlates with the amount of oxides included in the powder. A shaped object and a coating layer obtained from this powder having an oxygen concentration of less than 1000 ppm have excellent strength. From these viewpoints, the oxygen concentration is particularly preferably 500 ppm or less. As a method for measuring oxygen concentrations, a dispersive infrared absorption method is used. Examples of the measurement devices include EMGA-930 available from Horiba Ltd.

Because the metal powder according to the present invention can be densely spread, the impregnation of a low-melting-point metal into a shaped object as disclosed in Japanese Patent Laid-Open Publication No. 2001-152204 is not needed. Even when a shaped object obtained from this powder is used in a high-temperature environment, there is no low-melting-point metal that causes melting. This shaped object is suitable for use in a high-temperature environment. Needless to say, the shaped object may be impregnated with a low-melting-point metal.

Because the metal powder according to the present invention has excellent fluidity, aggregation prevention particles as disclosed in Japanese Patent Laid-Open Publication No. 2006-321711 are not needed. In a powder that does not include aggregation prevention particles, there are no aggregation prevention particles that inhibit particles from being bound together. Thus, a shaped object and a coating layer obtained from this powder have excellent strength. Needless to say, this powder may include aggregation prevention particles.

Because a shaped object and a coating layer obtained from the metal powder according to the present invention have excellent strength, the mixing of a laser absorbent into this powder as disclosed in Japanese Patent Laid-Open Publication No. 2011-21218 is not needed. Thus, there is no defect generated that is due to a laser absorbent. Needless to say, this powder may have a laser absorbent mixed thereinto.

As above-described, the metal powder according to the present invention has a value Y of 7.5 to 24.0. The particles included in this powder has a nearly spherical shape. This powder has excellent fluidity and packing properties and hence causes smaller volume shrinkage during melting. A shaped object and a coating layer obtained from this powder have fewer holes. From this powder, a shaped object and a coating layer that have excellent strength can be obtained. From the viewpoint of strength, the value Y is more preferably 18.0 or less, particularly preferably 12.0 or less.

The particle size D10 is preferably 5 μm or more, particularly preferably 10 μm or more, from the viewpoint that particles are less likely to become satellites. The particle size D10 is preferably 15 μm or less.

From the viewpoint of the general-purpose properties for a shaped object and a coating layer, the particle size D50 is preferably 15 μm to 50 μm, particularly preferably 20 μm to 30 μm.

From the viewpoint of the general-purpose properties, the particle size D60 is preferably 18 μm to 70 μm, particularly preferably 24 μm to 45 μm.

The metal powder according to the present invention can be produced by various processes. Specific examples of the production processes include a water atomization process, a gas atomization process, a plasma atomization process, a rotating electrode process, a centrifugal atomization process, a melt spinning process, a mechanical pulverization process, and a chemical reduction process. Preferred production processes are a water atomization process, a gas atomization process, and a disc atomization process. In particular, a gas atomization process is preferable. A plurality of production processes may be combined. For example, a powder obtained by a water atomization process may be mechanically pulverized.

In an example of a water atomization process, a raw material is poured into a crucible having pores at the bottom. This raw material is heated by means of a high-frequency induction furnace under the atmosphere of the air, argon gas, or nitrogen gas, and is melted. Water is spouted against the raw material flowing out through the pores. The raw material is rapidly cooled and solidified to afford a powder.

In an example of a gas atomization process, a raw material is poured into a crucible having pores at the bottom. This raw material is heated by means of a high-frequency induction furnace under the atmosphere of the air, argon gas, or nitrogen gas, and is melted. Helium gas, argon gas, or nitrogen gas is spouted against the raw material flowing out through the pores. The raw material is rapidly cooled and solidified to afford a powder.

By controlling the conditions for atomization, a powder having a suitable Y value can be obtained. From a powder obtained by atomization, particles having a suitable particle size, density, and specific surface area may be selected. An example of selecting methods is sieving through meshes.

EXAMPLES

Below, the effects of the present invention will be clarified by Examples, but the present invention is not to be construed in a limited manner on the basis of the description of the Examples.

For Examples and Comparative Examples, various parameters relating to a metal powder were determined as follows.

[Particle Sizes D10, D50, and D60, and Mode Diameter Dm]

The particle sizes D10, D50, and D60, and mode diameter Dm were determined on the basis of a particle size distribution measured by a laser diffraction scattering method using a laser diffraction scattering particle size distribution analyzer "Microtrac MT3000" available from Nikkiso Co., Ltd. In measuring a particle size distribution using the Microtrac MT3000, powder together with pure water is poured into the cell of this analyzer, and particle sizes are detected on the basis of light scattering information of the particles.

[True Density ρ]

The true density ρ was measured by a gas displacement method using a dry-type automated densimeter "AccuPyc II1340" available from Shimadzu Corporation.

[Specific Surface Area S]

The specific surface area S was measured by a gas adsorption method using a flow-type automated specific surface area analyzer "FlowSorb III2305" available from Shimadzu Corporation.

[Value Y]

The value Y was calculated by the following equation:

$$Y = D50 \times \rho \times S$$

wherein D50 represents a cumulative 50 vol % particle size of the powder, ρ represents a true density of the powder, and S represents a specific surface area of the powder.

[Ratio P2]

For the circularity of powder, 500 particles were each measured for circularity using an image analysis device, the number of the particles having a circularity of 0.95 or more was measured, and the ratio that the number accounts for with respect to the total number was P2.

[Oxygen Concentration]

The oxygen concentration of powder was measured by a dispersive infrared absorption method using an analyzer "EMGA-930" available from Horiba Ltd.

[Experiment 1]

[Provision of Alloy]

The alloys having the compositions I to IX shown in the following Table 1 were provided. Here, in Table 1, "Bal." means the balance.

TABLE 1

| | Composition (mass %) | | | | | | | | | | | | | | | | | | |
|---|---|---|---|---|---|---|---|---|---|---|---|---|---|---|---|---|---|---|---|
| | C | Si | Ni | Cr | Mo | Al | Ti | V | W | Nb | Co | Fe | Zn | Ta | B | Ag | Cu | Sn | T.C. |
| I | — | — | — | — | — | — | — | — | — | — | — | Bal. | — | — | — | — | — | — | 100.0 |
| II | 0.1 | — | 4.0 | 16.3 | — | — | — | — | — | — | 0.3 | Bal. | — | — | — | — | — | — | 83.3 |
| III | 0.1 | — | 18.0 | — | 5.1 | 0.1 | 0.8 | — | — | — | 9.0 | Bal. | — | — | — | — | — | — | 93.9 |
| IV | — | — | Bal. | — | — | — | — | — | — | — | — | — | — | — | — | — | — | — | 100.0 |
| V | — | — | Bal. | 15.2 | 15.6 | 0.2 | — | — | 3.7 | — | 0.8 | 5.5 | — | — | — | — | — | — | 65.3 |
| VI | 0.1 | — | Bal. | — | 4.5 | 6.0 | 2.8 | — | — | 5.5 | — | — | 0.1 | 2.3 | — | — | — | — | 78.7 |
| VII | — | — | — | — | — | — | — | — | — | — | — | Bal. | — | — | — | — | — | — | 100.0 |
| VIII | 2.5 | — | 1.3 | 29.5 | 0.8 | — | — | — | 13.5 | — | Bal. | — | — | — | — | — | — | — | 53.7 |
| IX | 1.7 | — | — | — | — | — | — | — | 9.0 | 10.0 | Bal. | — | — | 5.0 | — | — | — | — | 74.3 |

T.C.: the total of Ni, Fe, and Co

[Production of Powder]

From 9 kinds of alloy shown in Table 1, metal powders of Examples 1 to 162 and Comparative Examples 1 to 54 shown in Tables 2 to 10 were obtained. Each powder was obtained by classifying many particles with a sieve. The particles were obtained by a water atomization process, a gas atomization process, or a disc atomization process. As shown below, the powders were each measured for flow rate in accordance with the specification of "JIS Z 2502", and evaluated for fluidity. This fluidity correlates with the strengths of a shaped object and a coating layer.

[Composition I]

The powders of Examples 1 to 18 and Comparative Examples 1 to 6 obtained from the alloy having the composition I were measured for flow rate, and rated in accordance with the following criteria:
S: less than 20.0 s/50 g
A: 20.0 s/50 g or more, less than 22.0 s/50 g
B: 22.0 s/50 g or more, less than 24.0 s/50 g
C: 24.0 s/50 g or more, less than 26.0 s/50 g
F: 26.0 s/50 g or more (or not flowing)
These results are shown in the following Table 2.

TABLE 2

Evaluation Results

| | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Example 1 | 74.7 | 7970 | 36.6 | 22.4 | 79.2 | 21.8 | 0.61 | 3.5 | 51.7 | 220 | 22.7 | B |
| Example 2 | 44.1 | 7730 | 69.2 | 17.6 | 49.0 | 23.6 | 0.79 | 2.8 | 65.3 | 150 | 23.3 | B |
| Example 3 | 43.2 | 7990 | 25.8 | 8.6 | 47.1 | 8.9 | 0.65 | 5.5 | 60.5 | 400 | 22.7 | B |
| Example 4 | 37.9 | 7870 | 23.5 | 11.4 | 42.1 | 7.0 | 1.32 | 3.7 | 58.0 | 340 | 22.6 | B |
| Example 5 | 63.9 | 8010 | 13.5 | 25.6 | 69.0 | 6.9 | 1.49 | 2.7 | 56.5 | 570 | 24 | B |
| Example 6 | 80.9 | 7930 | 28.2 | 24.3 | 86.6 | 18.1 | 1.43 | 3.6 | 70.7 | 290 | 23 | B |
| Example 7 | 31.5 | 7800 | 55.4 | 12.6 | 33.4 | 13.6 | 1.11 | 2.7 | 54.4 | 960 | 20.9 | A |
| Example 8 | 93.5 | 7850 | 13.2 | 37.4 | 100.0 | 9.7 | 1.05 | 2.7 | 72.8 | 210 | 20.2 | A |
| Example 9 | 26.0 | 7710 | 93.3 | 5.2 | 27.8 | 18.7 | 0.84 | 5.4 | 62.3 | 90 | 20.7 | A |
| Example 10 | 83.6 | 7810 | 12.7 | 25.1 | 96.1 | 8.3 | 0.89 | 3.8 | 58.3 | 320 | 21.8 | A |
| Example 11 | 49.4 | 7980 | 22.1 | 14.8 | 54.8 | 8.7 | 1.37 | 3.7 | 95.9 | 560 | 18.4 | S |
| Example 12 | 96.2 | 8010 | 10.1 | 38.5 | 109.7 | 7.8 | 1.00 | 2.9 | 84.7 | 710 | 19.6 | S |
| Example 13 | 19.7 | 7770 | 86.2 | 3.9 | 22.7 | 13.2 | 0.84 | 5.8 | 86.7 | 430 | 19.5 | S |
| Example 14 | 50.9 | 7910 | 57.9 | 10.2 | 56.0 | 23.3 | 1.18 | 5.5 | 89.6 | 920 | 18.1 | S |
| Example 15 | 99.4 | 7880 | 19.9 | 19.9 | 104.4 | 15.6 | 0.78 | 5.3 | 84.3 | 1190 | 25.5 | C |
| Example 16 | 59.3 | 7940 | 23.4 | 17.8 | 64.6 | 11.0 | 1.39 | 3.6 | 51.9 | 1060 | 24.3 | C |
| Example 17 | 77.4 | 7930 | 38.6 | 31.0 | 82.0 | 23.7 | 0.94 | 2.7 | 56.5 | 1840 | 24.6 | C |
| Example 18 | 37.6 | 7790 | 49.8 | 11.3 | 41.4 | 14.6 | 0.98 | 3.7 | 78.3 | 2100 | 24.6 | C |
| Comparative Example 1 | 91.6 | 7990 | 63.1 | 27.5 | 96.2 | 46.2 | 1.07 | 3.5 | 78.0 | 950 | 26.3 | F |
| Comparative Example 2 | 28.4 | 7780 | 129.3 | 8.5 | 31.2 | 28.6 | 1.24 | 3.7 | 88.4 | 30 | not flowing | F |
| Comparative Example 3 | 74.8 | 7730 | 47.2 | 29.9 | 86.0 | 27.3 | 1.02 | 2.9 | 88.5 | 220 | 26.5 | F |
| Comparative Example 4 | 27.7 | 7840 | 276.3 | 0.5 | 30.7 | 60.0 | 1.50 | 61.5 | 90.2 | 380 | not flowing | F |
| Comparative Example 5 | 13.9 | 7980 | 200.3 | 0.5 | 14.6 | 22.2 | 1.34 | 29.2 | 60.2 | 800 | 29.6 | F |
| Comparative Example 6 | 38.7 | 7770 | 221.7 | 0.5 | 43.0 | 66.7 | 1.39 | 85.9 | 67.0 | 630 | 26.9 | F |

[Composition II]

The powders of Examples 19 to 36 and Comparative Examples 7 to 12 obtained from the alloy having the composition II were measured for flow rate, and rated in accordance with the following criteria:
S: less than 21.0 s/50 g
A: 21.0 s/50 g or more, less than 23.0 s/50 g
B: 23.0 s/50 g or more, less than 25.0 s/50 g
C: 25.0 s/50 g or more, less than 27.0 s/50 g
F: 27.0 s/50 g or more (or not flowing)
These results are shown in the following Table 3.

TABLE 3

Evaluation Results

| | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Example 19 | 85.2 | 7860 | 31.8 | 17.0 | 92.9 | 21.3 | 0.48 | 5.5 | 66.1 | 816 | 24.5 | B |
| Example 20 | 21.0 | 7830 | 108.3 | 4.2 | 23.5 | 17.8 | 0.47 | 5.6 | 63.3 | 881 | 24.7 | B |
| Example 21 | 40.7 | 7880 | 68.3 | 9.8 | 45.6 | 21.9 | 0.74 | 4.7 | 62.6 | 720 | 24.9 | B |
| Example 22 | 21.7 | 7710 | 56.8 | 4.6 | 23.4 | 9.5 | 1.34 | 5.1 | 83.9 | 948 | 23.4 | B |

TABLE 3-continued

Evaluation Results

|  | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Example 23 | 62.1 | 7900 | 28.7 | 14.3 | 68.3 | 14.1 | 1.37 | 4.8 | 80.0 | 113 | 24.2 | B |
| Example 24 | 50.1 | 7720 | 22.5 | 11.0 | 55.6 | 8.7 | 1.48 | 5.0 | 88.3 | 945 | 23.7 | B |
| Example 25 | 87.8 | 7940 | 32.7 | 22.8 | 94.8 | 22.8 | 1.02 | 4.2 | 77.4 | 562 | 22.5 | A |
| Example 26 | 75.2 | 7910 | 32.1 | 19.6 | 82.0 | 19.1 | 1.18 | 4.2 | 69.2 | 227 | 22.7 | A |
| Example 27 | 65.1 | 7950 | 40.8 | 16.9 | 69.0 | 21.1 | 0.86 | 4.1 | 88.7 | 907 | 21.5 | A |
| Example 28 | 84.5 | 7810 | 10.5 | 25.4 | 92.1 | 6.9 | 0.82 | 3.6 | 57.7 | 719 | 22.4 | A |
| Example 29 | 80.8 | 7840 | 17.7 | 19.4 | 87.3 | 11.2 | 1.01 | 4.5 | 97.0 | 661 | 19 | S |
| Example 30 | 19.8 | 7780 | 110.4 | 4.8 | 22.4 | 17.0 | 0.83 | 4.7 | 91.1 | 160 | 19.3 | S |
| Example 31 | 48.8 | 7830 | 46.3 | 11.7 | 51.7 | 17.7 | 1.01 | 4.4 | 94.5 | 693 | 20.5 | S |
| Example 32 | 61.1 | 7950 | 44.9 | 14.7 | 66.0 | 21.8 | 0.91 | 4.5 | 96.4 | 926 | 19.1 | S |
| Example 33 | 63.3 | 7760 | 42.1 | 19.0 | 68.4 | 20.7 | 1.00 | 3.6 | 57.7 | 1108 | 26.6 | C |
| Example 34 | 99.7 | 7840 | 8.6 | 24.9 | 108.7 | 6.7 | 0.94 | 4.4 | 53.3 | 2198 | 25.4 | C |
| Example 35 | 23.8 | 7700 | 42.6 | 7.1 | 25.9 | 7.8 | 1.10 | 3.6 | 87.7 | 1665 | 25.9 | C |
| Example 36 | 34.0 | 7660 | 66.8 | 9.2 | 36.7 | 17.4 | 0.81 | 4.0 | 96.2 | 1293 | 25.7 | C |
| Comparative Example 7 | 84.5 | 7720 | 46.6 | 16.9 | 97.2 | 30.4 | 1.05 | 5.8 | 78.0 | 781 | 25.1 | F |
| Comparative Example 8 | 25.5 | 7650 | 177.9 | 7.4 | 27.5 | 34.7 | 1.00 | 3.7 | 88.4 | 784 | 25.1 | F |
| Comparative Example 9 | 57.6 | 7940 | 69.5 | 15.6 | 65.7 | 31.8 | 1.09 | 4.2 | 88.5 | 191 | 26.4 | F |
| Comparative Example 10 | 29.4 | 7890 | 52.2 | 0.5 | 31.2 | 12.1 | 0.98 | 62.3 | 90.2 | 827 | 26.1 | F |
| Comparative Example 11 | 15.4 | 7930 | 107.3 | 0.5 | 16.2 | 13.1 | 1.40 | 32.3 | 60.2 | 510 | not flowing | F |
| Comparative Example 12 | 96.1 | 7880 | 19.3 | 0.5 | 104.7 | 14.6 | 1.15 | 209.5 | 67.0 | 123 | 25.7 | F |

[Composition III]

The powders of Examples 37 to 54 and Comparative Examples 13 to 18 obtained from the alloy having the composition III were measured for flow rate, and rated in accordance with the following criteria:
S: less than 21.0 s/50 g
A: 21.0 s/50 g or more, less than 23.0 s/50 g
B: 23.0 s/50 g or more, less than 25.0 s/50 g
C: 25.0 s/50 g or more, less than 27.0 s/50 g
F: 27.0 s/50 g or more (or not flowing)
These results are shown in the following Table 4.

TABLE 4

Evaluation Results

|  | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Example 37 | 85.9 | 8360 | 18.8 | 24.9 | 97.9 | 13.5 | 0.55 | 3.9 | 85.4 | 576 | 20.8 | B |
| Example 38 | 81.2 | 8110 | 25.2 | 21.1 | 90.9 | 16.6 | 0.60 | 4.3 | 62.6 | 325 | 19.1 | B |
| Example 39 | 19.0 | 8420 | 145.6 | 4.4 | 20.1 | 23.3 | 0.64 | 4.6 | 55.8 | 403 | 19.6 | B |
| Example 40 | 63.2 | 8290 | 22.1 | 15.8 | 68.3 | 11.6 | 1.34 | 4.3 | 69.3 | 731 | 20.8 | B |
| Example 41 | 25.5 | 8370 | 70.7 | 5.4 | 26.8 | 15.1 | 1.29 | 5.0 | 70.9 | 425 | 19.9 | B |
| Example 42 | 89.1 | 8420 | 18.9 | 24.9 | 98.0 | 14.2 | 1.33 | 3.9 | 79.6 | 114 | 19.4 | B |
| Example 43 | 79.4 | 8130 | 17.0 | 23.0 | 83.4 | 11.0 | 1.02 | 3.6 | 80.8 | 272 | 18.9 | A |
| Example 44 | 46.1 | 8100 | 22.8 | 11.1 | 48.4 | 8.5 | 1.08 | 4.4 | 59.2 | 893 | 18.1 | A |
| Example 45 | 84.7 | 8240 | 32.2 | 19.5 | 95.7 | 22.5 | 0.98 | 4.9 | 69.4 | 212 | 18.3 | A |
| Example 46 | 80.1 | 8270 | 20.1 | 24.0 | 86.5 | 13.3 | 0.96 | 3.6 | 66.3 | 435 | 17.9 | A |
| Example 47 | 69.7 | 8290 | 22.7 | 16.7 | 79.5 | 13.1 | 1.19 | 4.8 | 95.9 | 677 | 15.4 | S |
| Example 48 | 16.4 | 8260 | 50.9 | 3.8 | 17.4 | 6.9 | 0.94 | 4.6 | 94.1 | 585 | 15.8 | S |
| Example 49 | 84.2 | 8140 | 12.3 | 25.3 | 90.9 | 8.4 | 1.01 | 3.6 | 94.3 | 177 | 15.6 | S |
| Example 50 | 33.7 | 8310 | 23.2 | 6.7 | 37.7 | 6.5 | 0.82 | 5.6 | 92.0 | 268 | 15.9 | S |
| Example 51 | 69.2 | 8290 | 24.6 | 19.4 | 78.2 | 14.1 | 0.81 | 4.0 | 55.3 | 1769 | 21.5 | C |
| Example 52 | 24.5 | 8430 | 75.0 | 7.4 | 27.7 | 15.5 | 0.96 | 3.8 | 68.3 | 2291 | 22.7 | C |
| Example 53 | 88.5 | 8350 | 30.9 | 19.5 | 94.7 | 22.8 | 0.86 | 4.9 | 59.0 | 2435 | 21.9 | C |
| Example 54 | 55.9 | 8330 | 42.5 | 11.2 | 59.3 | 19.8 | 1.00 | 5.3 | 90.7 | 2154 | 22.3 | C |
| Comparative Example 13 | 61.8 | 8180 | 66.1 | 14.2 | 68.0 | 33.4 | 1.06 | 4.8 | 78.0 | 441 | not flowing | F |
| Comparative Example 14 | 62.3 | 8140 | 61.9 | 18.1 | 66.7 | 31.4 | 1.47 | 3.7 | 88.4 | 624 | 24.2 | F |

TABLE 4-continued

Evaluation Results

|  | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Comparative Example 15 | 90.0 | 8290 | 37.8 | 19.8 | 100.8 | 28.2 | 0.68 | 5.1 | 88.5 | 551 | not flowing | F |
| Comparative Example 16 | 62.3 | 8420 | 43.8 | 0.5 | 69.8 | 23.0 | 1.04 | 139.6 | 90.2 | 291 | 23.5 | F |
| Comparative Example 17 | 57.8 | 8130 | 51.1 | 0.5 | 64.7 | 24.0 | 1.13 | 129.5 | 60.2 | 712 | not flowing | F |
| Comparative Example 18 | 57.6 | 8430 | 41.8 | 0.5 | 64.5 | 20.3 | 1.38 | 129.0 | 67.0 | 753 | 24.7 | F |

[Composition IV]

The powders of Examples 55 to 72 and Comparative Examples 19 to 24 obtained from the alloy having the composition IV were measured for flow rate, and rated in accordance with the following criteria:

S: less than 17.0 s/50 g
A: 17.0 s/50 g or more, less than 19.0 s/50 g
B: 19.0 s/50 g or more, less than 21.0 s/50 g
C: 21.0 s/50 g or more, less than 23.0 s/50 g
F: 23.0 s/50 g or more (or not flowing)

These results are shown in the following Table 5.

TABLE 5

Evaluation Results

|  | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Example 55 | 37.7 | 8830 | 47.5 | 10.9 | 41.1 | 15.8 | 0.72 | 3.8 | 71.7 | 264 | 28.4 | B |
| Example 56 | 15.3 | 8740 | 68.1 | 4.6 | 16.2 | 9.1 | 0.48 | 3.5 | 65.0 | 914 | 27.8 | B |
| Example 57 | 66.2 | 8970 | 31.2 | 14.6 | 74.8 | 18.5 | 0.71 | 5.1 | 84.7 | 858 | 28.5 | B |
| Example 58 | 35.0 | 8760 | 77.3 | 7.4 | 38.2 | 23.7 | 1.41 | 5.2 | 65.9 | 150 | 27.4 | B |
| Example 59 | 59.5 | 8820 | 24.2 | 17.3 | 64.3 | 12.7 | 1.26 | 3.7 | 63.4 | 745 | 27.3 | B |
| Example 60 | 73.0 | 8880 | 16.0 | 16.8 | 77.4 | 10.4 | 1.43 | 4.6 | 83.7 | 761 | 29 | B |
| Example 61 | 87.7 | 8940 | 17.5 | 20.2 | 98.2 | 13.7 | 0.97 | 4.9 | 88.1 | 339 | 26 | A |
| Example 62 | 39.7 | 8900 | 34.8 | 11.9 | 44.1 | 12.3 | 1.09 | 3.7 | 83.9 | 753 | 26.8 | A |
| Example 63 | 50.3 | 8780 | 36.2 | 12.6 | 53.8 | 16.0 | 0.97 | 4.3 | 72.8 | 553 | 25.8 | A |
| Example 64 | 73.8 | 8970 | 22.7 | 17.0 | 79.0 | 15.0 | 1.15 | 4.7 | 64.6 | 807 | 25.5 | A |
| Example 65 | 60.9 | 8980 | 42.8 | 12.8 | 68.8 | 23.4 | 0.90 | 5.4 | 96.5 | 629 | 23.7 | S |
| Example 66 | 85.6 | 8840 | 29.3 | 17.1 | 91.6 | 22.2 | 1.02 | 5.4 | 93.8 | 644 | 23.7 | S |
| Example 67 | 36.7 | 9000 | 71.1 | 11.0 | 41.8 | 23.5 | 1.15 | 3.8 | 92.3 | 162 | 23.2 | S |
| Example 68 | 62.7 | 8930 | 25.2 | 15.0 | 69.0 | 14.1 | 0.88 | 4.6 | 91.8 | 626 | 23.7 | S |
| Example 69 | 28.2 | 8940 | 34.5 | 7.9 | 31.9 | 8.7 | 1.00 | 4.0 | 66.6 | 1412 | 30.9 | C |
| Example 70 | 44.7 | 8890 | 18.9 | 12.1 | 46.9 | 7.5 | 0.99 | 3.9 | 53.6 | 1729 | 29.3 | C |
| Example 71 | 47.6 | 8880 | 51.1 | 13.8 | 53.8 | 21.6 | 0.82 | 3.9 | 56.2 | 2326 | 29.4 | C |
| Example 72 | 30.4 | 8800 | 48.6 | 7.0 | 33.4 | 13.0 | 0.94 | 4.8 | 55.6 | 1983 | 30.8 | C |
| Comparative Example 19 | 15.6 | 8790 | 238.5 | 4.2 | 17.8 | 32.7 | 0.91 | 4.2 | 78.0 | 219 | 32 | F |
| Comparative Example 20 | 69.4 | 8820 | 46.4 | 16.7 | 79.1 | 28.4 | 0.94 | 4.8 | 88.4 | 115 | 32.2 | F |
| Comparative Example 21 | 28.6 | 8900 | 136.3 | 7.7 | 32.6 | 34.7 | 0.90 | 4.2 | 88.5 | 440 | 33.3 | F |
| Comparative Example 22 | 55.8 | 8940 | 12.6 | 0.5 | 59.1 | 6.3 | 0.97 | 118.3 | 90.2 | 314 | not flowing | F |
| Comparative Example 23 | 83.7 | 8940 | 29.4 | 0.5 | 93.7 | 22.0 | 0.93 | 187.5 | 60.2 | 787 | 34 | F |
| Comparative Example 24 | 20.7 | 8750 | 112.6 | 0.5 | 22.4 | 20.4 | 1.01 | 44.7 | 67.0 | 204 | 31.9 | F |

[Composition V]

The powders of Examples 73 to 90 and Comparative Examples 25 to 30 obtained from the alloy having the composition V were measured for flow rate, and rated in accordance with the following criteria:

S: less than 25.0 s/50 g
A: 25.0 s/50 g or more, less than 27.0 s/50 g
B: 27.0 s/50 g or more, less than 29.0 s/50 g
C: 31.0 s/50 g or more, less than 33.0 s/50 g
F: 33.0 s/50 g or more (or not flowing)

These results are shown in the following Table 6.

TABLE 6

Evaluation Results

| | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Example 73 | 52.4 | 9030 | 17.5 | 11.5 | 55.0 | 8.3 | 0.56 | 4.8 | 83.8 | 478 | 18.5 | B |
| Example 74 | 95.2 | 9170 | 16.0 | 23.8 | 100.0 | 14.0 | 0.72 | 4.2 | 63.7 | 936 | 17.4 | B |
| Example 75 | 69.6 | 9050 | 37.6 | 16.7 | 80.0 | 23.7 | 0.55 | 4.8 | 68.2 | 321 | 17.7 | B |
| Example 76 | 90.4 | 9240 | 9.1 | 20.8 | 100.3 | 7.6 | 1.30 | 4.8 | 77.3 | 279 | 18.7 | B |
| Example 77 | 86.6 | 9290 | 13.5 | 25.1 | 91.8 | 10.9 | 1.21 | 3.7 | 76.1 | 215 | 18.8 | B |
| Example 78 | 34.8 | 9300 | 69.8 | 10.4 | 36.5 | 22.6 | 1.34 | 3.5 | 59.1 | 524 | 18 | B |
| Example 79 | 42.3 | 9040 | 48.6 | 11.8 | 47.0 | 18.6 | 1.08 | 4.0 | 63.4 | 206 | 16.8 | A |
| Example 80 | 77.5 | 9330 | 12.4 | 18.6 | 86.8 | 9.0 | 1.16 | 4.7 | 82.9 | 942 | 16.8 | A |
| Example 81 | 83.1 | 9210 | 13.6 | 18.3 | 88.1 | 10.4 | 1.11 | 4.8 | 63.4 | 635 | 16 | A |
| Example 82 | 54.8 | 9230 | 32.4 | 13.7 | 58.1 | 16.4 | 1.04 | 4.2 | 79.5 | 864 | 16.4 | A |
| Example 83 | 49.0 | 9130 | 38.7 | 11.8 | 51.9 | 17.3 | 0.89 | 4.4 | 92.4 | 699 | 13.2 | S |
| Example 84 | 72.6 | 9100 | 10.0 | 14.5 | 81.3 | 6.6 | 1.05 | 5.6 | 91.6 | 364 | 13.5 | S |
| Example 85 | 44.6 | 9270 | 23.9 | 12.0 | 46.8 | 9.9 | 0.95 | 3.9 | 94.9 | 685 | 13.5 | S |
| Example 86 | 81.3 | 9180 | 17.8 | 23.6 | 93.5 | 13.3 | 1.02 | 4.0 | 95.5 | 587 | 14.3 | S |
| Example 87 | 57.1 | 9300 | 30.7 | 17.1 | 63.4 | 16.3 | 0.93 | 3.7 | 63.0 | 2286 | 19.9 | C |
| Example 88 | 92.1 | 9240 | 13.3 | 19.3 | 102.2 | 11.3 | 0.86 | 5.3 | 74.5 | 1925 | 20.7 | C |
| Example 89 | 24.3 | 9040 | 47.3 | 5.1 | 27.0 | 10.4 | 0.86 | 5.3 | 71.2 | 2260 | 20.5 | C |
| Example 90 | 64.3 | 9340 | 17.2 | 16.1 | 69.4 | 10.3 | 1.15 | 4.3 | 55.2 | 1554 | 20.4 | C |
| Comparative Example 25 | 31.6 | 9040 | 105.0 | 9.2 | 33.2 | 30.0 | 0.79 | 3.6 | 78.0 | 177 | 22.7 | F |
| Comparative Example 26 | 78.7 | 9130 | 36.9 | 15.7 | 88.1 | 26.5 | 1.35 | 5.6 | 88.4 | 767 | 23.8 | F |
| Comparative Example 27 | 46.7 | 9090 | 60.1 | 9.3 | 49.0 | 25.5 | 1.03 | 5.3 | 88.5 | 524 | not flowing | F |
| Comparative Example 28 | 46.4 | 9240 | 38.5 | 0.5 | 52.4 | 16.5 | 0.81 | 104.9 | 90.2 | 205 | 24.4 | F |
| Comparative Example 29 | 20.3 | 9350 | 121.2 | 0.5 | 23.1 | 23.0 | 0.74 | 46.3 | 60.2 | 155 | 24.9 | F |
| Comparative Example 30 | 56.3 | 9200 | 35.7 | 0.5 | 63.6 | 18.5 | 0.76 | 127.2 | 67.0 | 899 | not flowing | F |

[Composition VI]

The powders of Examples 91 to 108 and Comparative Examples 31 to 36 obtained from the alloy having the composition VI were measured for flow rate, and rated in accordance with the following criteria:

S: less than 15.0 s/50 g
A: 15.0 s/50 g or more, less than 17.0 s/50 g
B: 17.0 s/50 g or more, less than 19.0 s/50 g
C: 21.0 s/50 g or more, less than 23.0 s/50 g
F: 23.0 s/50 g or more (or not flowing)
These results are shown in the following Table 7.

TABLE 7

Evaluation Results

| | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Example 91 | 99.1 | 8520 | 9.7 | 21.8 | 108.0 | 8.2 | 0.46 | 5.0 | 85.4 | 383 | 30.6 | B |
| Example 92 | 61.9 | 8480 | 28.2 | 18.0 | 67.5 | 14.8 | 0.62 | 3.8 | 61.8 | 648 | 30.7 | B |
| Example 93 | 36.8 | 8630 | 74.6 | 9.9 | 39.4 | 23.7 | 0.73 | 4.0 | 82.0 | 537 | 29.8 | B |
| Example 94 | 43.0 | 8510 | 46.5 | 12.5 | 45.6 | 17.0 | 1.36 | 3.7 | 55.5 | 919 | 30.3 | B |
| Example 95 | 81.2 | 8460 | 13.0 | 24.4 | 87.7 | 8.9 | 1.47 | 3.6 | 58.7 | 598 | 29.4 | B |
| Example 96 | 88.6 | 8720 | 17.6 | 22.2 | 93.9 | 13.6 | 1.25 | 4.2 | 74.2 | 820 | 29.7 | B |
| Example 97 | 65.0 | 8780 | 36.1 | 15.0 | 74.1 | 20.6 | 0.97 | 5.0 | 79.5 | 659 | 27.1 | A |
| Example 98 | 35.8 | 8620 | 48.0 | 10.7 | 40.8 | 14.8 | 1.12 | 3.8 | 76.9 | 658 | 28.5 | A |
| Example 99 | 63.2 | 8590 | 27.3 | 16.4 | 67.6 | 14.8 | 1.00 | 4.1 | 75.0 | 642 | 27.4 | A |
| Example 100 | 92.6 | 8460 | 14.8 | 25.9 | 104.6 | 11.6 | 0.92 | 4.0 | 63.2 | 630 | 27.6 | A |
| Example 101 | 95.4 | 8500 | 11.1 | 20.0 | 104.9 | 9.0 | 1.00 | 5.2 | 92.9 | 754 | 26.8 | S |
| Example 102 | 43.1 | 8470 | 21.1 | 10.8 | 47.8 | 7.7 | 1.11 | 4.4 | 92.9 | 259 | 25.3 | S |
| Example 103 | 94.0 | 8740 | 28.1 | 22.6 | 103.4 | 23.1 | 0.81 | 4.6 | 97.1 | 351 | 25.2 | S |
| Example 104 | 64.7 | 8690 | 40.4 | 17.5 | 74.4 | 22.7 | 0.93 | 4.3 | 95.0 | 344 | 26.8 | S |
| Example 105 | 15.6 | 8720 | 164.7 | 4.7 | 17.3 | 22.4 | 0.99 | 3.7 | 80.4 | 2323 | 32.9 | C |
| Example 106 | 96.7 | 8610 | 19.2 | 20.3 | 109.3 | 16.0 | 0.96 | 5.4 | 83.7 | 2469 | 32.3 | C |
| Example 107 | 89.3 | 8690 | 20.1 | 25.9 | 99.1 | 15.6 | 0.83 | 3.8 | 83.5 | 2433 | 31.8 | C |
| Example 108 | 15.2 | 8580 | 83.6 | 4.3 | 16.1 | 10.9 | 1.01 | 3.8 | 81.3 | 2082 | 31.3 | C |
| Comparative Example 31 | 21.2 | 8540 | 159.6 | 6.1 | 22.9 | 28.9 | 0.91 | 3.7 | 78.0 | 374 | not flowing | F |
| Comparative Example 32 | 76.1 | 8710 | 43.8 | 19.8 | 81.4 | 29.0 | 0.82 | 4.1 | 88.4 | 849 | not flowing | F |
| Comparative Example 33 | 91.1 | 8690 | 36.8 | 21.0 | 98.4 | 29.1 | 0.71 | 4.7 | 88.5 | 437 | not flowing | F |

TABLE 7-continued

| | | | Specific Surface | | | | | | | Oxygen | | |
| | D50 (μm) | ρ (kg/m³) | Area (m²/kg) | D10 (μm) | D60 (μm) | Value Y | D50/Dm | D60/D10 | P2 (%) | Concentration (ppm) | Fluidity (s/50 g) | Overall Evaluation |
|---|---|---|---|---|---|---|---|---|---|---|---|---|
| Comparative Example 34 | 98.7 | 8620 | 19.7 | 0.5 | 109.6 | 16.8 | 1.35 | 219.1 | 90.2 | 903 | 35.7 | F |
| Comparative Example 35 | 42.2 | 8750 | 63.1 | 0.5 | 47.3 | 23.3 | 1.23 | 94.5 | 60.2 | 220 | 39.3 | F |
| Comparative Example 36 | 49.3 | 8730 | 54.4 | 0.5 | 53.7 | 23.4 | 1.41 | 107.5 | 67.0 | 277 | 39.1 | F |

[Composition VII]

The powders of Examples 109 to 126 and Comparative Examples 37 to 42 obtained from the alloy having the composition VII were measured for flow rate, and rated in accordance with the following criteria:

S: less than 27.0 s/50 g
A: 27.0 s/50 g or more, less than 29.0 s/50 g
B: 29.0 s/50 g or more, less than 31.0 s/50 g
C: 33.0 s/50 g or more, less than 35.0 s/50 g
F: 35.0 s/50 g or more (or not flowing)

These results are shown in the following Table 8.

TABLE 8

| | | | Specific Surface | | | | | | | Oxygen | | |
| | D50 (μm) | ρ (kg/m³) | Area (m²/kg) | D10 (μm) | D60 (μm) | Value Y | D50/Dm | D60/D10 | P2 (%) | Concentration (ppm) | Fluidity (s/50 g) | Overall Evaluation |
|---|---|---|---|---|---|---|---|---|---|---|---|---|
| Example 109 | 22.5 | 9020 | 113.3 | 4.7 | 25.9 | 23.0 | 0.59 | 5.5 | 70.7 | 489 | 20.4 | B |
| Example 110 | 41.5 | 8880 | 33.6 | 11.2 | 47.3 | 12.4 | 0.49 | 4.2 | 77.0 | 155 | 21.9 | B |
| Example 111 | 59.1 | 8730 | 44.6 | 12.4 | 66.2 | 23.0 | 0.61 | 5.3 | 56.6 | 177 | 21.5 | B |
| Example 112 | 76.5 | 8720 | 12.9 | 23.0 | 82.6 | 8.6 | 1.50 | 3.6 | 63.6 | 133 | 21.5 | B |
| Example 113 | 91.7 | 9020 | 11.4 | 22.9 | 96.3 | 9.4 | 1.29 | 4.2 | 79.7 | 431 | 21.1 | B |
| Example 114 | 27.1 | 8680 | 52.3 | 5.7 | 29.8 | 12.3 | 1.47 | 5.2 | 85.3 | 676 | 21.2 | B |
| Example 115 | 51.6 | 8940 | 16.7 | 12.4 | 57.3 | 7.7 | 1.00 | 4.6 | 81.8 | 112 | 18.3 | A |
| Example 116 | 18.8 | 8800 | 108.2 | 5.1 | 21.6 | 17.9 | 1.06 | 4.3 | 69.0 | 197 | 19.6 | A |
| Example 117 | 90.7 | 8840 | 27.3 | 25.4 | 100.7 | 21.9 | 0.82 | 4.0 | 78.9 | 146 | 19.2 | A |
| Example 118 | 60.0 | 8770 | 39.5 | 16.2 | 63.6 | 20.8 | 1.18 | 3.9 | 88.4 | 332 | 18.1 | A |
| Example 119 | 45.4 | 8940 | 53.2 | 10.0 | 50.8 | 21.6 | 1.06 | 5.1 | 96.0 | 138 | 17.6 | S |
| Example 120 | 49.8 | 8750 | 18.1 | 11.0 | 52.8 | 7.9 | 1.19 | 4.8 | 97.4 | 506 | 17.9 | S |
| Example 121 | 45.0 | 8720 | 54.3 | 12.2 | 47.3 | 21.3 | 1.03 | 3.9 | 92.2 | 777 | 17.4 | S |
| Example 122 | 77.3 | 8870 | 16.0 | 17.0 | 81.9 | 11.0 | 1.11 | 4.8 | 91.1 | 140 | 16.5 | S |
| Example 123 | 68.8 | 8880 | 25.4 | 15.1 | 76.4 | 15.5 | 0.81 | 5.0 | 90.3 | 1128 | 23.8 | C |
| Example 124 | 17.3 | 8950 | 87.8 | 5.0 | 18.7 | 13.6 | 1.05 | 3.7 | 57.8 | 1119 | 22.8 | C |
| Example 125 | 36.9 | 8900 | 29.8 | 10.3 | 39.1 | 9.8 | 0.93 | 3.8 | 63.4 | 2136 | 22.5 | C |
| Example 126 | 76.8 | 8740 | 17.0 | 18.4 | 81.4 | 11.4 | 0.99 | 4.4 | 55.3 | 1351 | 23.5 | C |
| Comparative Example 37 | 55.8 | 8970 | 60.1 | 16.7 | 64.2 | 30.1 | 1.24 | 3.8 | 78.0 | 546 | 27.9 | F |
| Comparative Example 38 | 59.4 | 8970 | 56.1 | 12.5 | 67.1 | 29.9 | 1.46 | 5.4 | 88.4 | 787 | 27.1 | F |
| Comparative Example 39 | 89.7 | 8870 | 39.7 | 25.1 | 96.9 | 31.6 | 0.70 | 3.9 | 88.5 | 382 | not flowing | F |
| Comparative Example 40 | 23.6 | 8720 | 86.5 | 0.5 | 25.5 | 17.8 | 1.31 | 51.0 | 90.2 | 653 | 28 | F |
| Comparative Example 41 | 59.0 | 8980 | 15.7 | 0.5 | 62.0 | 8.3 | 0.94 | 123.9 | 60.2 | 562 | not flowing | F |
| Comparative Example 42 | 92.6 | 8960 | 17.0 | 0.5 | 101.9 | 14.1 | 0.92 | 203.7 | 67.0 | 171 | 28.3 | F |

[Composition VIII]

The powders of Examples 127 to 144 and Comparative Examples 43 to 48 obtained from the alloy having the composition VIII were measured for flow rate, and rated in accordance with the following criteria:

S: less than 18.0 s/50 g
A: 18.0 s/50 g or more, less than 20.0 s/50 g
B: 20.0 s/50 g or more, less than 22.0 s/50 g
C: 22.0 s/50 g or more, less than 24.0 s/50 g
F: 24.0 s/50 g or more (or not flowing)

These results are shown in the following Table 9.

TABLE 9

Evaluation Results

| | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Example 127 | 55.8 | 10070 | 41.5 | 12.3 | 58.6 | 23.3 | 0.62 | 4.8 | 81.3 | 349 | 15.4 | B |
| Example 128 | 17.2 | 9950 | 43.8 | 3.8 | 18.7 | 7.5 | 0.73 | 5.0 | 87.4 | 164 | 14.8 | B |
| Example 129 | 50.4 | 9880 | 38.4 | 11.6 | 55.9 | 19.1 | 0.78 | 4.8 | 82.9 | 390 | 15.7 | B |
| Example 130 | 71.7 | 9870 | 27.8 | 21.5 | 76.0 | 19.7 | 1.36 | 3.5 | 67.2 | 902 | 14.4 | B |
| Example 131 | 48.0 | 9830 | 37.1 | 12.0 | 54.7 | 17.5 | 1.31 | 4.6 | 61.8 | 913 | 15.6 | B |
| Example 132 | 65.0 | 10130 | 24.5 | 15.0 | 72.8 | 16.1 | 1.29 | 4.9 | 52.0 | 210 | 15.4 | B |
| Example 133 | 34.3 | 9790 | 60.8 | 7.5 | 36.7 | 20.4 | 0.90 | 4.9 | 75.0 | 118 | 13.2 | A |
| Example 134 | 54.9 | 9860 | 28.6 | 16.5 | 61.5 | 15.5 | 0.83 | 3.7 | 56.9 | 157 | 12.8 | A |
| Example 135 | 64.5 | 9910 | 24.4 | 16.8 | 69.7 | 15.6 | 0.81 | 4.2 | 89.0 | 154 | 13.5 | A |
| Example 136 | 68.8 | 9930 | 18.6 | 18.6 | 74.3 | 12.7 | 0.92 | 4.0 | 66.9 | 850 | 13.6 | A |
| Example 137 | 77.7 | 10050 | 10.4 | 15.5 | 82.4 | 8.1 | 1.06 | 5.3 | 95.5 | 777 | 10.4 | S |
| Example 138 | 55.8 | 10130 | 25.5 | 14.0 | 64.2 | 14.4 | 1.14 | 4.6 | 94.9 | 424 | 11.8 | S |
| Example 139 | 61.9 | 9890 | 24.5 | 14.2 | 66.2 | 15.0 | 0.82 | 4.7 | 97.7 | 630 | 11.7 | S |
| Example 140 | 29.7 | 9940 | 73.5 | 6.8 | 33.9 | 21.7 | 0.89 | 5.0 | 96.6 | 544 | 11.4 | S |
| Example 141 | 29.1 | 10020 | 52.8 | 8.7 | 32.3 | 15.4 | 0.99 | 3.7 | 63.2 | 1265 | 16.2 | C |
| Example 142 | 95.4 | 9760 | 7.3 | 23.9 | 108.8 | 6.8 | 1.11 | 4.6 | 84.8 | 2266 | 18 | C |
| Example 143 | 43.0 | 9810 | 43.6 | 11.6 | 47.7 | 18.4 | 1.02 | 4.1 | 66.8 | 2302 | 16.3 | C |
| Example 144 | 31.1 | 9940 | 50.8 | 7.2 | 35.5 | 15.7 | 1.13 | 5.0 | 51.9 | 2343 | 16.9 | C |
| Comparative Example 43 | 98.0 | 9750 | 31.5 | 19.6 | 111.7 | 30.1 | 1.11 | 5.7 | 78.0 | 389 | 20.1 | F |
| Comparative Example 44 | 73.6 | 9790 | 46.6 | 19.9 | 79.5 | 33.6 | 1.49 | 4.0 | 88.4 | 196 | 21.9 | F |
| Comparative Example 45 | 50.8 | 9910 | 51.4 | 10.7 | 54.4 | 25.9 | 0.72 | 5.1 | 88.5 | 251 | 19.6 | F |
| Comparative Example 46 | 16.8 | 10050 | 119.0 | 0.5 | 18.0 | 20.1 | 0.77 | 36.0 | 90.2 | 429 | not flowing | F |
| Comparative Example 47 | 17.2 | 9870 | 96.6 | 0.5 | 18.2 | 16.4 | 1.39 | 36.5 | 60.2 | 165 | 24.8 | F |
| Comparative Example 48 | 26.1 | 10000 | 85.4 | 0.5 | 29.8 | 22.3 | 1.18 | 59.5 | 67.0 | 335 | 20.9 | F |

[Composition IX]

The powders of Examples 145 to 162 and Comparative Examples 49 to 54 obtained from the alloy having the composition IX were measured for flow rate, and rated in accordance with the following criteria:

S: less than 12.0 s/50 g
A: 12.0 s/50 g or more, less than 14.0 s/50 g
B: 14.0 s/50 g or more, less than 16.0 s/50 g
C: 16.0 s/50 g or more, less than 18.0 s/50 g
F: 18.0 s/50 g or more (or not flowing)
These results are shown in the following Table 10.

TABLE 10

Evaluation Results

| | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|
| Example 145 | 78.5 | 10080 | 26.7 | 16.5 | 87.1 | 21.1 | 0.54 | 5.3 | 60.0 | 381 | 15.1 | B |
| Example 146 | 50.0 | 9880 | 14.4 | 14.0 | 53.0 | 7.1 | 0.67 | 3.8 | 88.7 | 150 | 16.4 | B |
| Example 147 | 28.1 | 10070 | 39.9 | 7.6 | 29.8 | 11.3 | 0.57 | 3.9 | 66.2 | 214 | 15.4 | B |
| Example 148 | 69.4 | 9980 | 33.8 | 13.9 | 73.6 | 23.4 | 1.44 | 5.3 | 51.5 | 365 | 15.5 | B |
| Example 149 | 51.3 | 9970 | 15.4 | 11.8 | 54.9 | 7.9 | 1.38 | 4.7 | 72.4 | 909 | 15.2 | B |
| Example 150 | 74.6 | 9920 | 21.2 | 15.7 | 80.6 | 15.7 | 1.35 | 5.1 | 64.1 | 567 | 15.7 | B |
| Example 151 | 23.3 | 9870 | 103.1 | 6.8 | 25.2 | 23.7 | 0.83 | 3.7 | 81.3 | 697 | 13.7 | A |
| Example 152 | 45.4 | 9920 | 20.4 | 10.0 | 47.7 | 9.2 | 0.81 | 4.8 | 80.1 | 143 | 14.9 | A |
| Example 153 | 78.0 | 9890 | 10.6 | 21.1 | 88.9 | 8.2 | 0.86 | 4.2 | 66.5 | 453 | 13.4 | A |
| Example 154 | 62.8 | 10120 | 14.2 | 18.2 | 71.6 | 9.0 | 1.04 | 3.9 | 77.1 | 158 | 14.3 | A |
| Example 155 | 99.7 | 9900 | 19.5 | 19.9 | 106.7 | 19.2 | 1.06 | 5.4 | 91.3 | 146 | 11.4 | S |
| Example 156 | 16.0 | 10080 | 71.3 | 4.5 | 16.8 | 11.5 | 1.19 | 3.8 | 95.0 | 534 | 12.9 | S |
| Example 157 | 74.6 | 9970 | 15.3 | 17.9 | 80.6 | 11.4 | 0.82 | 4.5 | 96.3 | 520 | 11.5 | S |
| Example 158 | 80.8 | 9890 | 19.0 | 19.4 | 92.1 | 15.2 | 0.91 | 4.8 | 97.0 | 696 | 12.9 | S |
| Example 159 | 59.0 | 10060 | 21.6 | 15.9 | 67.9 | 12.8 | 1.00 | 4.3 | 80.0 | 1850 | 18.9 | C |
| Example 160 | 62.2 | 9980 | 34.6 | 13.1 | 70.9 | 21.5 | 0.87 | 5.4 | 60.8 | 1409 | 18.4 | C |
| Example 161 | 53.1 | 10150 | 37.9 | 15.9 | 58.9 | 20.4 | 1.05 | 3.7 | 97.7 | 1211 | 19 | C |
| Example 162 | 18.4 | 10060 | 75.6 | 4.0 | 21.0 | 14.0 | 1.04 | 5.2 | 87.1 | 2269 | 17.2 | C |
| Comparative Example 49 | 59.8 | 10020 | 45.6 | 13.2 | 68.8 | 27.3 | 1.35 | 5.2 | 78.0 | 516 | not flowing | F |
| Comparative Example 50 | 71.0 | 9880 | 41.8 | 15.6 | 74.6 | 29.3 | 1.28 | 4.8 | 88.4 | 387 | 24.2 | F |
| Comparative Example 51 | 79.2 | 9930 | 41.5 | 23.0 | 91.1 | 32.6 | 0.73 | 4.0 | 88.5 | 613 | not flowing | F |

TABLE 10-continued

| | Evaluation Results | | | | | | | | | | | |
|---|---|---|---|---|---|---|---|---|---|---|---|---|
| | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
| Comparative Example 52 | 48.6 | 9890 | 26.8 | 0.5 | 54.4 | 12.9 | 1.13 | 108.9 | 90.2 | 508 | 24.3 | F |
| Comparative Example 53 | 82.7 | 10140 | 21.1 | 0.5 | 92.6 | 17.7 | 1.49 | 185.2 | 60.2 | 807 | not flowing | F |
| Comparative Example 54 | 78.9 | 10010 | 16.1 | 0.5 | 87.6 | 12.7 | 1.35 | 175.2 | 67.0 | 464 | 20 | F |

As shown in Tables 2 to 10, the overall evaluation of the powder of each Example was excellent. Form these results, the superiority of the present invention is obvious.

[Experiment 2]
[Provision of Alloy]
The alloys having the compositions I-1 to IX-2 shown in the following Table 11 were provided. Here, in Table 11, "Bal." means the balance.

TABLE 11

| | Composition (mass %) | | | | | | | | | | | | | | | | | |
|---|---|---|---|---|---|---|---|---|---|---|---|---|---|---|---|---|---|---|
| | C | Si | Ni | Cr | Mo | Al | Ti | V | W | Nb | Co | Fe | Zn | Ta | B | Ag | Cu | Sn | T.C. |
| I-1 | — | 3.0 | — | — | — | — | — | — | — | — | — | Bal. | — | — | — | — | — | — | 97.0 |
| I-2 | — | — | — | — | — | — | — | — | — | — | — | Bal. | — | — | — | — | — | 0.1 | 99.9 |
| II-1 | 0.1 | — | 4.0 | 16.3 | — | — | — | 0.5 | — | — | 0.3 | Bal. | — | — | — | — | — | — | 82.8 |
| II-2 | 0.1 | — | 4.0 | 16.3 | — | — | — | — | — | — | 0.3 | Bal. | — | — | — | 0.3 | — | — | 83.0 |
| III-1 | 0.1 | — | 18.0 | — | 5.1 | 0.1 | 0.8 | — | — | — | 9.0 | Bal. | — | — | — | — | 2.0 | — | 91.9 |
| III-2 | 0.1 | — | 18.0 | — | 5.1 | 0.1 | 0.8 | — | — | — | 9.0 | Bal. | — | — | 0.2 | — | — | — | 93.7 |
| IV-1 | — | — | Bal. | — | — | — | 5.0 | — | — | — | — | — | — | — | — | — | — | — | 95.0 |
| IV-2 | — | — | Bal. | — | — | — | — | — | — | — | — | — | — | — | — | — | — | 2.0 | 98.0 |
| V-1 | — | — | Bal. | 15.2 | 15.6 | 0.2 | — | — | 3.7 | — | 0.8 | 5.5 | — | — | — | — | 3.0 | — | 62.3 |
| V-2 | — | — | Bal. | 15.2 | 15.6 | 0.2 | — | — | 3.7 | — | 0.8 | 5.5 | — | — | — | 0.5 | — | — | 64.8 |
| VI-1 | 0.1 | 4.3 | Bal. | — | 4.5 | 6.0 | 2.8 | — | — | — | 5.5 | — | — | 0.1 | 2.3 | — | — | — | 74.4 |
| VI-2 | 0.1 | — | Bal. | — | 4.5 | 6.0 | 2.8 | — | — | — | 5.5 | — | — | 0.1 | 2.3 | 1.2 | — | — | 77.5 |
| VII-1 | — | — | — | — | — | — | — | — | — | — | Bal. | — | — | — | — | — | 15.4 | — | 84.6 |
| VII-2 | — | — | — | — | — | — | — | — | — | — | Bal. | — | — | — | — | — | — | 0.3 | 99.7 |
| VIII-1 | 2.5 | 0.4 | 1.3 | 29.5 | 0.8 | — | — | — | 13.5 | — | Bal. | — | — | — | — | — | — | — | 53.3 |
| VIII-2 | 2.5 | — | 1.3 | 29.5 | 0.8 | — | — | — | 13.5 | — | Bal. | — | — | — | — | — | 0.1 | — | 53.6 |
| IX-1 | 1.7 | — | — | — | — | — | — | 2.2 | 9.0 | 10.0 | Bal. | — | — | 5.0 | — | — | — | — | 72.2 |
| IX-2 | 1.7 | — | — | — | — | — | — | — | 9.0 | 10.0 | Bal. | — | — | 5.0 | 0.8 | — | — | — | 73.6 |

T.C.: the total of Ni, Fe, and Co

[Production of Powder]
From 18 kinds of alloy shown in Table 11, metal powders of Examples 163 to 252 and Comparative Examples 55 to 72 shown in Tables 12 to 14 were obtained. Each powder was obtained by classifying many particles with a sieve. The particles were obtained by a water atomization process, a gas atomization process, or a disc atomization process. As shown below, the powders were each measured for flow rate in accordance with the specification of "JIS Z 2502", and evaluated for fluidity. This fluidity correlates with the strengths of a shaped object and a coating layer.

[Composition I-1, I-2, II-1, II-2, III-1, and III-2]
The powders of Examples 163 to 192 and Comparative Examples 55 to 60 were measured for flow rate, and rated in accordance with the following criteria:
S: less than 20.0 s/50 g
A: 20.0 s/50 g or more, less than 22.0 s/50 g
B: 22.0 s/50 g or more, less than 24.0 s/50 g
C: 24.0 s/50 g or more, less than 26.0 s/50 g
F: 26.0 s/50 g or more (or not flowing)
These results are shown in the following Table 12.

TABLE 12

| | | Evaluation Results | | | | | | | | | | |
|---|---|---|---|---|---|---|---|---|---|---|---|---|
| | Composition | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
| Example 163 | I-2 | 73.2 | 8440 | 21.7 | 18.0 | 79.1 | 13.4 | 0.61 | 4.4 | 39.4 | 430 | 22.4 | B |
| Example 164 | III-2 | 18.3 | 7800 | 65.9 | 2.8 | 19.4 | 9.4 | 0.79 | 7.0 | 47.3 | 680 | 22.6 | B |
| Example 165 | I-1 | 13.7 | 7910 | 183.6 | 1.6 | 14.9 | 19.9 | 0.65 | 9.1 | 39.6 | 430 | 22.5 | B |

TABLE 12-continued

Evaluation Results

|  | Composition | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|---|
| Example 166 | I-2 | 14.0 | 8030 | 72.9 | 1.9 | 14.7 | 8.2 | 1.32 | 7.9 | 41.6 | 920 | 23.9 | B |
| Example 167 | III-1 | 39.0 | 7590 | 43.9 | 20.0 | 42.1 | 13.0 | 1.49 | 2.1 | 45.5 | 690 | 23.9 | B |
| Example 168 | I-1 | 46.6 | 7800 | 54.7 | 12.0 | 49.4 | 19.9 | 1.43 | 4.1 | 46.4 | 740 | 22.6 | B |
| Example 169 | I-2 | 29.9 | 7590 | 50.2 | 6.5 | 31.7 | 11.4 | 2.43 | 4.9 | 36.1 | 360 | 23.0 | B |
| Example 170 | I-2 | 51.5 | 7870 | 26.2 | 6.0 | 55.1 | 10.6 | 3.43 | 9.2 | 46.1 | 860 | 22.1 | B |
| Example 171 | I-1 | 70.1 | 7590 | 19.4 | 8.2 | 75.0 | 10.3 | 4.43 | 9.1 | 43.8 | 790 | 22.9 | B |
| Example 172 | II-2 | 27.3 | 8530 | 87.2 | 8.8 | 29.8 | 20.3 | 1.11 | 3.4 | 76.8 | 320 | 20.1 | A |
| Example 173 | II-2 | 85.7 | 7830 | 18.8 | 13.0 | 92.6 | 12.6 | 1.05 | 7.1 | 54.1 | 530 | 20.0 | A |
| Example 174 | I-2 | 18.7 | 7590 | 137.4 | 10.9 | 19.6 | 19.5 | 0.84 | 1.8 | 61.1 | 300 | 20.5 | A |
| Example 175 | III-2 | 12.5 | 7950 | 96.6 | 1.5 | 13.4 | 9.6 | 0.89 | 8.9 | 69.9 | 780 | 20.4 | A |
| Example 176 | II-2 | 35.3 | 7910 | 73.8 | 5.6 | 37.4 | 20.6 | 1.89 | 6.7 | 72.4 | 850 | 20.2 | A |
| Example 177 | II-2 | 83.2 | 7670 | 32.3 | 17.3 | 88.2 | 20.6 | 2.89 | 5.1 | 72.6 | 770 | 21.5 | A |
| Example 178 | II-1 | 38.1 | 7750 | 31.2 | 6.3 | 40.0 | 9.2 | 3.89 | 6.3 | 59.0 | 470 | 21.9 | A |
| Example 179 | II-2 | 16.8 | 8440 | 150.9 | 5.8 | 18.0 | 21.4 | 1.37 | 3.1 | 91.6 | 230 | 18.5 | S |
| Example 180 | II-2 | 89.4 | 8280 | 19.3 | 14.1 | 94.8 | 14.3 | 1.00 | 6.7 | 82.2 | 780 | 19.3 | S |
| Example 181 | III-2 | 62.8 | 8440 | 42.6 | 20.5 | 67.8 | 22.6 | 0.84 | 3.3 | 86.5 | 890 | 19.1 | S |
| Example 182 | II-1 | 71.2 | 7750 | 23.7 | 13.5 | 78.3 | 13.1 | 1.18 | 5.8 | 85.2 | 310 | 18.1 | S |
| Example 183 | II-2 | 88.6 | 7750 | 16.0 | 25.9 | 95.7 | 11.0 | 2.18 | 3.7 | 86.2 | 240 | 19.7 | S |
| Example 184 | II-2 | 47.6 | 8110 | 39.6 | 14.7 | 51.4 | 15.3 | 3.18 | 3.5 | 85.9 | 350 | 19.7 | S |
| Example 185 | I-1 | 40.5 | 8200 | 32.5 | 10.0 | 42.9 | 10.8 | 4.18 | 4.3 | 85.4 | 880 | 19.4 | S |
| Example 186 | III-1 | 27.7 | 7980 | 69.2 | 7.1 | 30.5 | 15.3 | 0.78 | 4.3 | 82.1 | 2080 | 24.4 | C |
| Example 187 | I-1 | 36.2 | 7750 | 34.9 | 12.4 | 39.8 | 9.8 | 1.39 | 3.2 | 60.6 | 2110 | 24.5 | C |
| Example 188 | I-1 | 52.5 | 8060 | 34.3 | 17.7 | 56.7 | 14.5 | 0.94 | 3.2 | 52.0 | 1110 | 24.7 | C |
| Example 189 | II-1 | 70.0 | 7800 | 40.7 | 8.3 | 75.6 | 22.2 | 0.98 | 9.1 | 43.3 | 2180 | 24.8 | C |
| Example 190 | I-2 | 11.0 | 8360 | 90.3 | 1.7 | 12.0 | 8.3 | 1.98 | 7.0 | 46.0 | 1270 | 25.0 | C |
| Example 191 | II-1 | 10.6 | 7670 | 180.8 | 5.3 | 11.7 | 14.7 | 2.98 | 2.2 | 66.9 | 1880 | 25.3 | C |
| Example 192 | I-1 | 11.2 | 7910 | 241.6 | 3.5 | 12.2 | 21.4 | 3.98 | 3.5 | 68.6 | 1440 | 25.1 | C |
| Comparative Example 55 | I-1 | 70.3 | 7670 | 53.0 | 32.1 | 73.8 | 28.6 | 1.07 | 2.3 | 80.7 | 190 | 28.4 | F |
| Comparative Example 56 | III-1 | 44.1 | 7640 | 73.3 | 7.3 | 47.2 | 24.7 | 1.24 | 6.5 | 41.6 | 440 | not flowing | F |
| Comparative Example 57 | II-1 | 76.2 | 7980 | 66.4 | 14.4 | 80.8 | 40.4 | 1.02 | 5.6 | 48.5 | 250 | 27.3 | F |
| Comparative Example 58 | II-2 | 33.0 | 8030 | 129.4 | 0.5 | 34.7 | 34.3 | 1.50 | 69.4 | 83.6 | 790 | not flowing | F |
| Comparative Example 59 | I-1 | 79.8 | 8030 | 80.7 | 0.5 | 86.2 | 51.7 | 1.34 | 172.4 | 72.0 | 410 | 27.0 | F |
| Comparative Example 60 | I-2 | 86.1 | 8030 | 70.3 | 0.5 | 93.8 | 48.6 | 1.39 | 187.6 | 70.7 | 790 | 28.8 | F |

[Composition IV-1, IV-2, V-1, V-2, VI-1, and VI-2]

The powders of Examples 193 to 222 and Comparative Examples 61 to 66 were measured for flow rate, and rated in accordance with the following criteria:

S: 22.0 s/50 g or less
A: more than 22.0 s/50 g, 24.0 s/50 g or less
B: 24.0 s/50 g or more, 26.0 s/50 g or less
C: more than 26.0 s/50 g, 28.0 s/50 g or less
F: more than 28.0 s/50 g (or not flowing)
These results are shown in the following Table 13.

TABLE 13

Evaluation Results

|  | Composition | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|---|
| Example 193 | V-1 | 22.7 | 8880 | 114.6 | 6.4 | 25.0 | 23.1 | 0.61 | 3.9 | 41.8 | 620 | 24.8 | B |
| Example 194 | VI-2 | 55.0 | 8610 | 38.4 | 12.9 | 60.5 | 18.2 | 0.79 | 4.7 | 36.4 | 910 | 24.1 | B |
| Example 195 | VI-2 | 72.8 | 9010 | 22.0 | 40.2 | 76.4 | 14.4 | 0.65 | 1.9 | 37.0 | 320 | 24.1 | B |
| Example 196 | VI-2 | 60.4 | 9280 | 25.9 | 14.3 | 65.8 | 14.5 | 1.32 | 4.6 | 40.8 | 940 | 24.0 | B |
| Example 197 | IV-2 | 43.3 | 8700 | 60.8 | 5.0 | 46.8 | 22.9 | 1.49 | 9.4 | 47.3 | 410 | 25.8 | B |
| Example 198 | V-1 | 79.8 | 9010 | 14.9 | 17.8 | 83.8 | 10.7 | 1.43 | 4.7 | 39.7 | 650 | 24.9 | B |
| Example 199 | VI-2 | 40.9 | 8610 | 61.9 | 24.1 | 43.4 | 21.8 | 2.43 | 1.8 | 35.7 | 470 | 25.5 | B |
| Example 200 | V-1 | 73.0 | 9010 | 25.8 | 46.4 | 78.8 | 17.0 | 3.43 | 1.7 | 41.8 | 680 | 25.6 | B |
| Example 201 | IV-1 | 23.0 | 9100 | 51.1 | 6.2 | 24.2 | 10.7 | 4.43 | 3.9 | 41.7 | 750 | 24.5 | B |
| Example 202 | V-2 | 38.8 | 8790 | 51.0 | 13.3 | 42.7 | 17.4 | 1.11 | 3.2 | 58.9 | 590 | 24.0 | A |
| Example 203 | V-2 | 69.3 | 8790 | 14.6 | 9.2 | 74.2 | 8.9 | 1.05 | 8.1 | 52.2 | 150 | 24.0 | A |
| Example 204 | IV-1 | 31.1 | 8790 | 36.6 | 8.0 | 33.0 | 10.0 | 0.84 | 4.1 | 67.3 | 440 | 24.0 | A |
| Example 205 | V-1 | 86.9 | 8790 | 26.8 | 9.9 | 93.9 | 20.5 | 0.89 | 9.5 | 66.9 | 930 | 23.0 | A |

TABLE 13-continued

Evaluation Results

|  | Composition | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|---|
| Example 206 | IV-1 | 36.5 | 8880 | 48.1 | 12.3 | 39.4 | 15.6 | 1.89 | 3.2 | 63.3 | 940 | 23.7 | A |
| Example 207 | IV-2 | 72.0 | 9280 | 25.7 | 17.9 | 77.0 | 17.2 | 2.89 | 4.3 | 72.7 | 710 | 23.0 | A |
| Example 208 | IV-1 | 36.9 | 8530 | 29.9 | 12.5 | 38.7 | 9.4 | 3.89 | 3.1 | 67.3 | 800 | 22.7 | A |
| Example 209 | V-2 | 47.9 | 8910 | 30.9 | 8.1 | 50.8 | 13.2 | 1.37 | 6.3 | 89.4 | 400 | 21.0 | S |
| Example 210 | VI-1 | 25.0 | 8880 | 51.8 | 7.1 | 27.5 | 11.5 | 1.00 | 3.9 | 84.7 | 320 | 22.0 | S |
| Example 211 | VI-1 | 13.9 | 8700 | 125.7 | 1.8 | 14.7 | 15.2 | 0.84 | 8.4 | 91.8 | 490 | 20.4 | S |
| Example 212 | V-2 | 62.6 | 9010 | 15.8 | 15.3 | 68.9 | 8.9 | 1.18 | 4.5 | 86.8 | 700 | 20.1 | S |
| Example 213 | VI-2 | 56.5 | 8700 | 28.5 | 7.8 | 59.3 | 14.0 | 2.18 | 7.6 | 84.3 | 370 | 20.0 | S |
| Example 214 | VI-2 | 29.0 | 8620 | 91.6 | 6.4 | 31.3 | 22.9 | 3.18 | 4.9 | 90.7 | 180 | 21.7 | S |
| Example 215 | IV-1 | 28.3 | 8620 | 86.9 | 5.1 | 29.7 | 21.2 | 4.18 | 5.8 | 85.2 | 760 | 21.0 | S |
| Example 216 | VI-2 | 29.4 | 9460 | 28.4 | 7.0 | 32.0 | 7.9 | 0.78 | 4.6 | 89.4 | 1320 | 26.9 | C |
| Example 217 | IV-2 | 39.1 | 9280 | 32.5 | 4.7 | 42.2 | 11.8 | 1.39 | 9.0 | 77.8 | 1690 | 26.4 | C |
| Example 218 | V-1 | 27.0 | 9370 | 87.4 | 5.5 | 28.6 | 22.1 | 0.94 | 5.2 | 57.4 | 2230 | 27.1 | C |
| Example 219 | IV-2 | 76.8 | 9460 | 32.5 | 19.7 | 80.6 | 23.6 | 0.98 | 4.1 | 46.6 | 1960 | 27.0 | C |
| Example 220 | IV-2 | 51.5 | 9010 | 49.8 | 7.8 | 56.1 | 23.1 | 1.98 | 7.2 | 73.9 | 1140 | 27.3 | C |
| Example 221 | V-2 | 14.4 | 8700 | 186.0 | 8.7 | 15.7 | 23.3 | 2.98 | 1.8 | 65.8 | 1960 | 27.3 | C |
| Example 222 | VI-2 | 12.1 | 9050 | 137.9 | 4.5 | 13.1 | 15.1 | 3.98 | 2.9 | 80.5 | 2120 | 27.1 | C |
| Comparative Example 61 | IV-2 | 53.2 | 8960 | 60.8 | 6.5 | 56.4 | 29.0 | 1.07 | 8.7 | 55.9 | 350 | 29.6 | F |
| Comparative Example 62 | V-1 | 26.4 | 9370 | 111.6 | 13.3 | 28.0 | 27.6 | 1.24 | 2.1 | 63.5 | 260 | not flowing | F |
| Comparative Example 63 | VI-2 | 89.5 | 8360 | 39.4 | 10.6 | 98.5 | 29.5 | 1.02 | 9.3 | 62.0 | 490 | 28.1 | F |
| Comparative Example 64 | IV-2 | 85.7 | 8610 | 61.8 | 0.5 | 90.0 | 45.6 | 1.50 | 180.0 | 37.3 | 830 | not flowing | F |
| Comparative Example 65 | IV-1 | 39.1 | 8910 | 139.5 | 0.5 | 41.4 | 48.6 | 1.34 | 82.8 | 56.6 | 300 | 28.9 | F |
| Comparative Example 66 | IV-1 | 63.1 | 8700 | 45.2 | 0.5 | 66.3 | 24.8 | 1.39 | 132.6 | 88.6 | 650 | 29.4 | F |

[Composition VII-1, VII-2, VIII-1, VIII-2, IX-1, and IX-2]

The powders of Examples 223 to 252 and Comparative Examples 67 to 72 were measured for flow rate, and rated in accordance with the following criteria:

S: less than 18.0 s/50 g
A: 18.0 s/50 g or more, less than 20.0 s/50 g
B: 20.0 s/50 g or more, less than 22.0 s/50 g
C: 22.0 s/50 g or more, less than 24.0 s/50 g
F: 24.0 s/50 g or more (or not flowing)
These results are shown in the following Table 14.

TABLE 14

Evaluation Results

|  | Composition | D50 (μm) | ρ (kg/m³) | Specific Surface Area (m²/kg) | D10 (μm) | D60 (μm) | Value Y | D50/Dm | D60/D10 | P2 (%) | Oxygen Concentration (ppm) | Fluidity (s/50 g) | Overall Evaluation |
|---|---|---|---|---|---|---|---|---|---|---|---|---|---|
| Example 223 | VII-2 | 69.3 | 10090 | 18.7 | 16.6 | 76.2 | 13.1 | 0.61 | 4.6 | 44.9 | 770 | 20.0 | B |
| Example 224 | VII-1 | 90.5 | 9720 | 24.7 | 18.3 | 95.0 | 21.7 | 0.79 | 5.2 | 46.0 | 440 | 20.8 | B |
| Example 225 | VIII-2 | 31.8 | 9040 | 37.2 | 4.2 | 34.3 | 10.7 | 0.65 | 8.2 | 47.6 | 280 | 21.7 | B |
| Example 226 | VIII-2 | 83.4 | 10290 | 13.4 | 11.2 | 88.4 | 11.5 | 1.32 | 7.9 | 36.1 | 290 | 20.9 | B |
| Example 227 | IX-2 | 44.1 | 8950 | 20.8 | 6.0 | 48.1 | 8.2 | 1.49 | 8.0 | 43.9 | 820 | 21.3 | B |
| Example 228 | IX-1 | 74.6 | 10120 | 25.4 | 9.0 | 78.3 | 19.2 | 1.43 | 8.7 | 38.2 | 590 | 20.4 | B |
| Example 229 | VII-2 | 76.2 | 8680 | 25.7 | 11.9 | 82.3 | 17.0 | 2.43 | 6.9 | 40.9 | 410 | 21.2 | B |
| Example 230 | IX-1 | 66.5 | 10090 | 14.0 | 12.5 | 72.5 | 9.4 | 3.43 | 5.8 | 41.4 | 760 | 20.7 | B |
| Example 231 | IX-2 | 53.9 | 9620 | 34.5 | 14.4 | 57.7 | 17.9 | 4.43 | 4.0 | 37.6 | 500 | 20.1 | B |
| Example 232 | VIII-2 | 72.2 | 9920 | 28.5 | 8.5 | 79.4 | 20.4 | 1.11 | 9.3 | 54.1 | 120 | 18.5 | A |
| Example 233 | VII-1 | 17.6 | 8860 | 93.0 | 2.7 | 19.4 | 14.5 | 1.05 | 7.2 | 53.8 | 290 | 19.9 | A |
| Example 234 | VII-2 | 35.9 | 9790 | 42.7 | 19.8 | 39.5 | 15.0 | 0.84 | 2.0 | 54.4 | 850 | 18.2 | A |
| Example 235 | IX-2 | 86.9 | 10020 | 26.5 | 11.3 | 93.9 | 23.1 | 0.89 | 8.3 | 55.1 | 870 | 18.1 | A |
| Example 236 | IX-2 | 89.4 | 10190 | 23.5 | 23.5 | 93.9 | 21.4 | 1.89 | 4.0 | 60.6 | 350 | 19.2 | A |
| Example 237 | VII-2 | 49.2 | 10090 | 26.8 | 16.2 | 53.6 | 13.3 | 2.89 | 3.3 | 66.0 | 340 | 19.5 | A |
| Example 238 | VIII-2 | 15.8 | 9620 | 94.1 | 8.3 | 17.4 | 14.3 | 3.89 | 2.1 | 72.1 | 780 | 18.0 | A |
| Example 239 | IX-1 | 62.1 | 8770 | 33.1 | 19.8 | 65.2 | 18.0 | 1.37 | 3.3 | 87.9 | 620 | 16.8 | S |
| Example 240 | IX-1 | 47.8 | 10220 | 44.0 | 18.1 | 52.6 | 21.5 | 1.00 | 2.9 | 82.1 | 120 | 16.8 | S |
| Example 241 | IX-1 | 14.6 | 8950 | 63.5 | 5.0 | 15.9 | 8.3 | 0.84 | 3.2 | 86.0 | 870 | 16.3 | S |
| Example 242 | VII-1 | 80.9 | 10020 | 14.9 | 20.8 | 87.4 | 12.1 | 1.18 | 4.2 | 85.5 | 360 | 17.0 | S |
| Example 243 | IX-2 | 47.6 | 10090 | 19.8 | 5.3 | 50.0 | 9.5 | 2.18 | 9.5 | 90.8 | 340 | 17.2 | S |
| Example 244 | VII-1 | 12.0 | 8950 | 154.6 | 1.7 | 13.2 | 16.6 | 3.18 | 7.9 | 84.0 | 210 | 17.4 | S |
| Example 245 | VII-2 | 41.4 | 9120 | 22.2 | 7.4 | 44.3 | 8.4 | 4.18 | 6.0 | 84.5 | 300 | 16.0 | S |

TABLE 14-continued

Evaluation Results

|  | Composition | D50 (μm) | ρ (kg/m³) | Specific Surface Area (m²/kg) | D10 (μm) | D60 (μm) | Value Y | D50/Dm | D60/ D10 | P2 (%) | Oxygen Concentration (ppm) | Fluidity (s/50 g) | Overall Evaluation |
|---|---|---|---|---|---|---|---|---|---|---|---|---|---|
| Example 246 | IX-1 | 81.6 | 9920 | 12.8 | 11.6 | 87.3 | 10.4 | 0.78 | 7.5 | 79.0 | 1150 | 23.4 | C |
| Example 247 | IX-2 | 62.9 | 10020 | 12.4 | 9.6 | 66.0 | 7.8 | 1.39 | 6.9 | 46.1 | 1620 | 23.7 | C |
| Example 248 | VII-1 | 11.8 | 9120 | 202.6 | 1.4 | 12.9 | 21.8 | 0.94 | 9.5 | 57.6 | 2460 | 22.7 | C |
| Example 249 | IX-1 | 33.2 | 9820 | 31.6 | 12.5 | 34.9 | 10.3 | 0.98 | 2.8 | 80.4 | 1520 | 22.4 | C |
| Example 250 | VIII-1 | 84.2 | 9690 | 15.0 | 18.5 | 92.6 | 12.2 | 1.98 | 5.0 | 36.7 | 2300 | 22.3 | C |
| Example 251 | IX-1 | 64.5 | 10190 | 33.0 | 11.3 | 69.0 | 21.7 | 2.98 | 6.1 | 88.2 | 1550 | 23.4 | C |
| Example 252 | VIII-1 | 84.1 | 9620 | 17.4 | 20.7 | 89.1 | 14.1 | 3.98 | 4.3 | 74.3 | 2090 | 22.8 | C |
| Comparative Example 67 | IX-2 | 42.0 | 9690 | 121.1 | 22.1 | 44.1 | 49.3 | 1.07 | 2.0 | 88.8 | 390 | 24.7 | F |
| Comparative Example 68 | IX-2 | 34.1 | 9890 | 80.9 | 5.1 | 36.8 | 27.3 | 1.24 | 7.2 | 82.2 | 520 | not flowing | F |
| Comparative Example 69 | VII-1 | 52.0 | 10120 | 93.1 | 11.2 | 56.2 | 49.0 | 1.02 | 5.0 | 87.9 | 800 | 26.9 | F |
| Comparative Example 70 | VII-1 | 59.9 | 10290 | 80.3 | 0.5 | 65.9 | 49.5 | 1.50 | 131.8 | 57.3 | 820 | not flowing | F |
| Comparative Example 71 | IX-2 | 25.2 | 8770 | 183.3 | 0.5 | 26.5 | 40.5 | 1.34 | 53.0 | 36.0 | 250 | 27.6 | F |
| Comparative Example 72 | VIII-1 | 66.7 | 10290 | 67.3 | 0.5 | 70.7 | 46.2 | 1.39 | 141.4 | 72.6 | 610 | 26.5 | F |

As shown in Tables 12 to 14, the overall evaluation of the powder of each Example was excellent. Form these results, the superiority of the present invention is obvious.

INDUSTRIAL APPLICABILITY

The powder according to the present invention is suitable for the types of 3D printers in which powder is spouted from a nozzle. The powder is suitable for the types of laser coating processes in which powder is spouted from a nozzle.

The invention claimed is:

1. A metal powder composed of many spherical particles, the metal powder comprising at least one of Ni, Fe, and Co,
    wherein the total content (T.C.) of the Ni, the Fe, and the Co is 50 mass % or more,
    wherein the metal powder has a cumulative 10 vol % particle size D10 of 1.0 μm or more,
    wherein a ratio P2 of the number of particles having a circularity of 0.95 or more to the total number of the particles is 50% or more, and
    wherein a value Y is 7.5 to 24.0 as calculated by the following mathematical equation:

$Y = D50 \text{ (m)} \times \rho \text{ (kg/m}^3\text{)} \times S \text{ (m}^2\text{/kg)}$ wherein D50 (m) represents a cumulative 50 vol % particle size of the powder, ρ (kg/m³) represents a true density of the powder, and S (m²/kg) represents a specific surface area of the powder.

2. The powder according to claim 1, wherein the balance other than the three kinds that are Ni, Fe, and Co comprises: at least one of C, Si, Cr, Mo, Al, Ti, V, W, Nb, Zn, Ta, B, Ag, Cu, and Sn; and an unavoidable impurity.

3. The powder according to claim 2, wherein a ratio of a cumulative 60 vol % particle size D60 to the particle size D10 (D60/D10) is 1.0 or more and less than 10.0.

4. The powder according to claim 3, wherein a ratio of the particle size D50 to a mode diameter Dm (D50/Dm) is 0.80 to 1.20.

5. The powder according to claim 4, wherein the ratio P2 is 80% or more.

6. The powder according to claim 3, wherein the ratio P2 is 80% or more.

7. The powder according to claim 2, wherein a ratio of the particle size D50 to a mode diameter Dm (D50/Dm) is 0.80 to 1.20.

8. The powder according to claim 7, wherein the ratio P2 is 80% or more.

9. The powder according to claim 2, wherein the ratio P2 is 80% or more.

10. The powder according to claim 1, wherein a ratio of a cumulative 60 vol % particle size D60 to the particle size D10 (D60/D10) is 1.0 or more and less than 10.0.

11. The powder according to claim 10, wherein a ratio of the particle size D50 to a mode diameter Dm (D50/Dm) is 0.80 to 1.20.

12. The powder according to claim 11, wherein the ratio P2 is 80% or more.

13. The powder according to claim 10, wherein the ratio P2 is 80% or more.

14. The powder according to claim 1, wherein a ratio of the particle size D50 to a mode diameter Dm (D50/Dm) is 0.80 to 1.20.

15. The powder according to claim 14, wherein the ratio P2 is 80% or more.

16. The powder according to claim 1, wherein the ratio P2 is 80% or more.

17. The powder according to claim 1, having an oxygen concentration of less than 1000 ppm.

18. The powder according to claim 1, wherein a flow rate is less than 35.0 s/50 g.

19. The powder according to claim 1, wherein a cumulative 60 vol % particle size D60 is 50.0 μm or more.

* * * * *

UNITED STATES PATENT AND TRADEMARK OFFICE
CERTIFICATE OF CORRECTION

PATENT NO. : 10,350,680 B2
APPLICATION NO. : 15/562600
DATED : July 16, 2019
INVENTOR(S) : Takahisa Yamamoto et al.

It is certified that error appears in the above-identified patent and that said Letters Patent is hereby corrected as shown below:

On the Title Page

Column 1, item (73) Line 1, delete "Specia" and insert -- Special --

Signed and Sealed this
Nineteenth Day of November, 2019

Andrei Iancu
*Director of the United States Patent and Trademark Office*